US012656271B2

(12) United States Patent　　(10) Patent No.: US 12,656,271 B2
Kikuchi　　　　　　　　　　　　　　(45) Date of Patent:　　Jun. 16, 2026

(54) BOARD TESTING APPARATUS AND BOARD TESTING METHOD

(71) Applicant: CKD CORPORATION, Aichi (JP)

(72) Inventor: Kazuyoshi Kikuchi, Aichi (JP)

(73) Assignee: CKD Corporation, Aichi (JP)

( * ) Notice: Subject to any disclaimer, the term of this patent is extended or adjusted under 35 U.S.C. 154(b) by 311 days.

(21) Appl. No.: 18/595,708

(22) Filed: Mar. 5, 2024

(65) Prior Publication Data

US 2024/0201106 A1　　Jun. 20, 2024

Related U.S. Application Data

(63) Continuation of application No. PCT/JP2022/011290, filed on Mar. 14, 2022.

(30) Foreign Application Priority Data

Sep. 17, 2021　　(JP) ................................. 2021-152042

(51) Int. Cl.
G01N 21/956　　(2006.01)
G01N 21/88　　(2006.01)
(Continued)

(52) U.S. Cl.
CPC ... G01N 21/95607 (2013.01); G01N 21/8851 (2013.01); G06T 7/001 (2013.01);
(Continued)

(58) Field of Classification Search
CPC . G06T 2207/10024; G06T 2207/30141; G06T 7/001; G06T 7/90;
(Continued)

(56) References Cited

U.S. PATENT DOCUMENTS

2005/0100206 A1* 5/2005 Imi ......................... G06T 7/001
382/145

FOREIGN PATENT DOCUMENTS

JP　　H08-201044 A　　8/1996
JP　　2000-91392 A　　3/2000
(Continued)

OTHER PUBLICATIONS

International Search Report issued in corresponding International Application No. PCT/JP2022/011290 mailed May 10, 2022 (5 pages).
(Continued)

*Primary Examiner* — Kenny A Cese
(74) *Attorney, Agent, or Firm* — Osha Bergman Watanabe & Burton LLP

(57) ABSTRACT

A board testing apparatus including: an image obtaining device that obtains an image of an inspection object area in a printed circuit board, the inspection object area including a component mounting area; and a control device that detects a foreign substance in the inspection object area based on the image, determines that the foreign substance is defective upon detecting that the foreign substance overlaps the component mounting area or is adjacent to the component mounting area when a lump part of the foreign substance has an area greater than an area threshold value or a length greater than a length threshold value, and determines that the foreign substance is non-defective upon detecting that the foreign substance neither overlaps the component mounting area nor is adjacent to the component mounting area even when the lump part has the area or the length.

9 Claims, 12 Drawing Sheets

(51) Int. Cl.
  *G06T 7/00* (2017.01)
  *G06T 7/90* (2017.01)
(52) U.S. Cl.
  CPC ........ *G06T 7/90* (2017.01); *G01N 2021/8887* (2013.01); *G01N 2021/95615* (2013.01); *G01N 2021/95638* (2013.01); *G06T 2207/10024* (2013.01); *G06T 2207/30141* (2013.01)
(58) Field of Classification Search
  CPC . G01N 2021/8887; G01N 2021/95615; G01N 2021/95638; G01N 2021/95646; G01N 21/8851; G01N 21/956; G01N 21/95607; G01N 21/95684
  USPC ......................................................... 382/147
  See application file for complete search history.

(56)  References Cited

FOREIGN PATENT DOCUMENTS

| JP | 2000-171410 | A | 6/2000 |
|----|-------------|---|--------|
| JP | 2001-15566  | A | 1/2001 |
| JP | 2001-74667  | A | 3/2001 |
| JP | 2001-331784 | A | 11/2001 |
| JP | 2003-65966  | A | 3/2003 |
| JP | 2003-302354 | A | 10/2003 |
| JP | 2006-138683 | A | 6/2006 |
| JP | 2006-220426 | A | 8/2006 |
| JP | 2010-159979 | A | 7/2010 |
| JP | 2013-205071 | A | 10/2013 |
| JP | 2017-125861 | A | 7/2017 |
| JP | 2018-113467 | A | 7/2018 |
| JP | 2021-103152 | A | 7/2021 |

OTHER PUBLICATIONS

Written Opinion issued in corresponding International Application No. PCT/JP2022/011290 mailed May 10, 2022 (4 pages).
Notice of Reasons for Refusal issued in corresponding Japanese Application No. 2021-152042 mailed Jul. 12, 2022 (6 pages).
Notice of Reasons for Refusal issued in corresponding Japanese Application No. 2021-152042 mailed Sep. 27, 2022 (6 pages).
International Preliminary Report on Patentability issued in corresponding International Application No. PCT/ JP2022/011290 mailed Mar. 5, 2024 (10 pages).

\* cited by examiner

BOARD TESTING APPARATUS AND BOARD TESTING METHOD

BACKGROUND

Technical Field

The present disclosure relates to a board testing apparatus for and a board testing method of performing an inspection for a printed circuit board.

Description of Related Art

A printed circuit board includes a base board in a flat plate-like shape, a circuit pattern and lands formed on a surface of the base board, and an insulating resist provided to coat a portion other than the lands on the surface of the base board.

In general, a board manufacturing line of mounting a component on the printed circuit board first prints solder paste on the lands (solder printing process). The board manufacturing line then temporarily mounts the component on the printed circuit board, based on the viscosity of the solder paste (mounting process). The board manufacturing line subsequently transfers this printed circuit board to a reflow furnace to heat and fuse the solder paste and to solder the component (reflow process).

In this board manufacturing line, an inspection is generally performed for any foreign substance on the printed circuit board, based on an image obtained by imaging the printed circuit board with solder paste printed thereon.

A proposed technique of detecting a foreign substance obtains an image by imaging a printed circuit board that is an inspection target and compares the obtained image with an image of a board as a model (a master board) to detect a foreign substance (as described in, for example, Patent Literature 1). This technique enables a foreign substance that is present on the printed circuit board to be easily detected. Patent Literature 1 describes exclusion of holes and a circuit pattern from the inspection target.

Another known technique of detecting a foreign substance sets such an area that corresponds to a mounting position of a component and that requires inspection for the presence or the absence of a foreign substance, as a foreign substance inspection area, and performs image processing for this set foreign substance inspection area as a target, so as to detect the presence or the absence of a foreign substance in the foreign substance inspection area (as described in, for example, Patent Literature 2). This technique performs the processing with setting only the area that specifically requires inspection for a foreign substance, as the target, and is thus expected to reduce the processing load.

PATENT LITERATURES

Patent Literature 1: Japanese Patent No. 2017-125861A
Patent Literature 2: Japanese Patent No. 2018-113467A In the case where a foreign substance is present on a printed circuit board, the foreign substance (for example, hair carbonized in the course of heating in a reflow furnace) at some location may cause a trouble such as a short circuit between a plurality of lands and thereby cause a functional problem on the printed circuit board. Even in the case where a foreign substance is present on the printed circuit board, however, when the foreign substance is, for example, placed on an insulating resist and is sufficiently away from lands and the like, the foreign substance may not cause any functional problem on the printed circuit board.

The technique described in above Patent Literature 1 excludes the holes and the circuit pattern from the inspection target as needed basis but basically performs detection of a foreign substance with setting an entire area of an image as a target. Accordingly, even when a foreign substance is present at a location where the foreign substance does not cause any functional problem on a printed circuit board, this technique determines the printed circuit board as defective due to detection of the foreign substance and may result in reducing the yield.

The technique described in above Patent Literature 2, on the other hand, performs detection for the presence or the absence of a foreign substance with setting a foreign substance inspection area as a target. This is expected to prevent defective determination of a printed circuit board due to a foreign substance that is present at a location where the foreign substance does not cause any functional problem on the printed circuit board. In the case of a relatively large foreign substance, even in the state that a foreign substance X only slightly overlaps a foreign substance inspection area Ar as shown in FIG. 18, this foreign substance X may cause a functional problem on a printed circuit board. The technique described in above Patent Literature 2 may, however, cause no detection of such a foreign substance or may neglect a detected foreign substance, since a range occupied by the foreign substance in such a state in the foreign substance inspection area has a significantly small area. Accordingly, irrespective of the presence of a foreign substance that may cause a functional problem on a printed circuit board that is an inspection target, this technique may erroneously determine the printed circuit board as non-defective.

SUMMARY

By taking into account the circumstances described above, one or more embodiments of the present disclosure provide, for example, a board testing apparatus that improves the yield and that allows for appropriate detection of a foreign substance that possibly causes a functional problem on a printed circuit board.

The following describes each of various aspects of the present disclosure. Functions and advantageous effects that are characteristic of each of the aspects are also described as appropriate.

Aspect 1. There is provided a board testing apparatus configured to perform an inspection for a printed circuit board with solder paste printed thereon. The board testing apparatus comprises an image obtaining unit (i.e., an image obtaining device) configured to obtain an image of an inspection object area in the printed circuit board, wherein the inspection object area includes a component mounting area where a component of the printed circuit board is mounted; a foreign substance detection unit (i.e., a control device) configured to detect a foreign substance in the inspection object area based on the image; and a defective/non-defective judgment unit (i.e., the control device) configured to determine that the foreign substance is defective upon detecting that the foreign substance overlaps the component mounting area or is adjacent to the component mounting area when a lump part of the foreign substance has an area greater than an area threshold value or a length greater than a length threshold value, and determine that the foreign substance is non-defective upon detecting that the foreign substance neither overlaps the component mounting area nor is adjacent to the component mounting area even when the lump part of the foreign substance has the area greater than the area threshold value or the length greater than the length threshold value.

The "component mounting area" denotes an area including an "area where a component is possibly mounted on", a land that is not covered by a resist but is exposed, and solder paste or an adhesive. The "component mounting area" is, however, not limited to a minimum area including the "area where a component is possibly mounted on", the land, and the solder paste or the adhesive but may be an area specified by appropriately extending the minimum area by taking into account, for example, a move of a foreign substance.

The "area where a component is possibly mounted on" basically indicates a "reference mounting position of a component". In the application of self-alignment, however, the "area where a component is possibly mounted on" is an area including expected mounting positions of the component that are offset corresponding to self-alignment. The "reference mounting position of a component" may be strictly set by using design information and manufacture information or may be set by a simplified method using the position of the land and the like.

In the board testing apparatus of Aspect 1, the foreign substance detection unit performs detection of a foreign substance with setting a wide area (inspection object area) including the component mounting area as a target. Even in the case of detection of a foreign substance, the board testing apparatus of this configuration does not immediately determine that the detected foreign substance is defective. The defective/non-defective judgment unit determines whether the detected foreign substance is defective or non-defective, based on the positional relationship between this foreign substance and the component mounting area.

Accordingly, even in the event of detection of a foreign substance, when it is expected that this foreign substance does not cause any functional problem on the printed circuit board, based on the positional relationship of the foreign substance to the component mounting area, this configuration determines that the foreign substance is non-defective. This configuration reliably prevents defective determination of the printed circuit board due to the presence of a foreign substance that is expected to cause no functional problem on the printed circuit board. As a result, this configuration reduces the number of printed circuit boards that are determined as defective and that are discarded and thereby improves the yield.

When it is expected that the detected foreign substance possibly causes a functional problem on the printed circuit board, based on the positional relationship of the foreign substance to the component mounting area, on the other hand, this configuration causes such a foreign substance to be determined as defective. This configuration appropriately detects a foreign substance that possibly causes a functional problem on the printed circuit board and more reliably prevents erroneous determination of the printed circuit board as non-defective.

Aspect 2. In the board testing apparatus described in Aspect 1, the defective/non-defective judgment unit may be configured to determine that the foreign substance is defective when the foreign substance overlaps the component mounting area or is adjacent to the component mounting area.

The configuration of Aspect 2 enables the determination of whether each foreign substance is a defective foreign substance that possibly causes a functional problem on the printed circuit board, to be performed relatively easily. This reduces the load of the determination process.

Aspect 3. The board testing apparatus described in either Aspect 1 or Aspect 2 may further comprise a display unit (i.e., a display) configured to display information. The display unit may be configured to display at least an image indicating the positional relationship of the foreign substance to the component mounting area.

The configuration of Aspect 3 allows for easy visual check of the positional relationship between the detected foreign substance and the component mounting area. Accordingly, this configuration enhances the convenience in confirmation of whether the inspection is performed appropriately (suitably for the purpose) and the convenience in confirmation and adjustment of inspection conditions.

Aspect 4. In the board testing apparatus described in any one of Aspects 1 to 3, the printed circuit board may include a green resist area, and the image obtaining unit may be configured to obtain, with a plurality of color lights, a color image of the inspection object area. The board testing apparatus of this aspect may further comprise a resist area information obtaining unit (i.e., the control device) configured to obtain resist area information that specifies a range occupied by the resist area in the printed circuit board; and a hue image obtaining unit (i.e., the control device) configured to obtain, from the color image, a hue image of the inspection object area. The foreign substance detection unit may be configured to detect the foreign substance in at least the resist area in the hue image specified based on the resist area information, using a hue difference of the foreign substance relative to the resist area.

The hair such as brown hair or blond hair out of foreign substances hardly makes a clear difference in lightness or in saturation relative to the green resist area. The hair such as brown hair or blond hair, on the other hand, tends to make a clear difference in hue relative to the green resist area. The configuration of Aspect 4 takes advantage of this characteristic and allows for detection of a foreign substance in at least the resist area of the hue image by utilizing a hue difference between the foreign substance and the resist area. This configuration accordingly enables the brown hair and the blond hair located in the resist area to be detected with high accuracy and enhances the capability of detection of the foreign substance.

Aspect 5. In the board testing apparatus described in any one of Aspects 1 to 4, the printed circuit board may include a green resist area, and the image obtaining unit may be configured to obtain, with a plurality of color lights, a color image of the inspection object area. The board testing apparatus of this aspect may further comprise a resist area information obtaining unit configured to obtain resist area information that specifies a range occupied by the resist area in the printed circuit board; and a saturation image obtaining unit (i.e., the control device) configured to obtain, from the color image, a saturation image of the inspection object area. The foreign substance detection unit may be configured to detect the foreign substance in at least the resist area in the saturation image specified based on the resist area information, using a saturation difference of the foreign substance relative to the resist area.

The hair such as black hair or gray hair out of foreign substances tends to make a clear difference in saturation relative to the green resist area. The configuration of Aspect 5 takes advantage of this characteristic and allows for detection of a foreign substance by utilizing a saturation difference between the foreign substance and the resist area. This configuration accordingly enables the black hair and the gray hair located in the resist area to be detected with high accuracy and enhances the capability of detection of the foreign substance.

One modification may employ both the configurations of Aspect 4 and of Aspect 5. This modification may be configured to detect a foreign substance by utilizing both a hue image and a saturation image of the inspection object area. This modified configuration enables the hairs of commonly found colors, such as black hair, gray hair, brown hair and blond hair, to be detected with high accuracy.

Aspect 6. There is provided a board testing method of performing an inspection for a printed circuit board with solder paste printed thereon. The board testing method comprises: an image obtaining process of obtaining an image of an inspection object area in the printed circuit board, wherein the inspection object area includes a component mounting area where a component of the printed circuit board is mounted; a foreign substance detection process of detecting a foreign substance in the inspection object area based on the image; and a defective/non-defective judgment process of determining that the foreign substance is defective upon detecting that the foreign substance overlaps the component mounting area or is adjacent to the component mounting area when a lump part of the foreign substance has an area greater than an area threshold value or a length greater than a length threshold value, and determining that the foreign substance is non-defective upon detecting that the foreign substance neither overlaps the component mounting area nor is adjacent to the component mounting area even when the lump part of the foreign substance has the area greater than the area threshold value or the length greater than the length threshold value.

The configuration of Aspect 6 has similar functions and advantageous effects to those of Aspect 1 described above.

Aspect 7. In the board testing method described in Aspect 6, the defective/non-defective judgment process may determine that the foreign substance is defective when the foreign substance overlaps the component mounting area or is adjacent to the component mounting area.

The configuration of Aspect 7 has similar functions and advantageous effects to those of Aspect 2 described above.

DETAILED DESCRIPTION OF EMBODIMENTS

The following describes embodiments with reference to drawings. The configuration of a printed circuit board 1 is described first.

Figure 1:
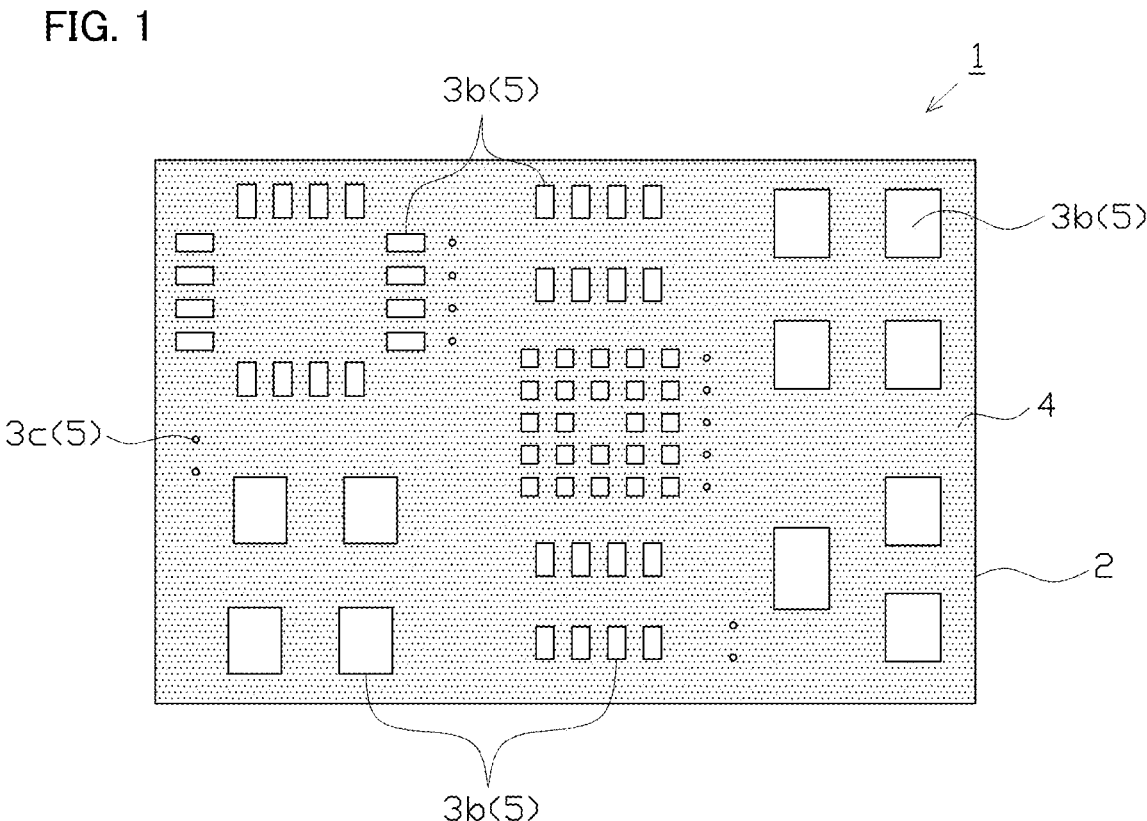
FIG. 1 is a schematic plan view illustrating a printed circuit board.
Figure 2:
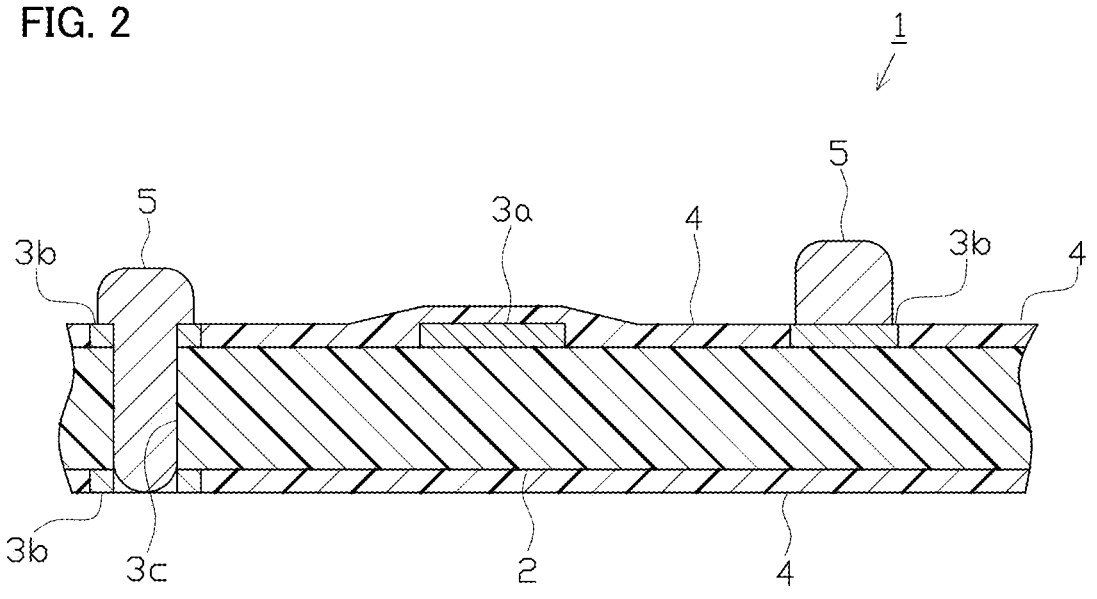
FIG. 2 is a partly enlarged schematic sectional view illustrating the printed circuit board.

As shown in FIG. 1 and FIG. 2, the printed circuit board 1 is configured by, for example, forming a circuit pattern 3a and lands 3b made of copper foil on a base board 2 in a flat plate-like shape made of, for example, a glass epoxy resin and forming through holes 3c pierced through the lands 3b provided on a surface and a rear face of the base board 2. Solder paste 5 obtained by kneading solder particles with flux is printed on the lands 3b and in the through holes 3c. Electrode portions of a non-illustrated predetermined component (for example, an electronic component) are made to be electrically connected with the lands 3b via the solder paste 5.

A green resist area 4 (an area of a dotted pattern shown in FIG. 1) is provided in a location other than the lands 3b on the surface of the base board 2. The resist area 4 is made of an insulating resist and serves to coat the base board 2 and the circuit pattern 3a. An adhesive used for fixing the component is applied on the printed circuit board 1 as needed basis.

Figure 3:
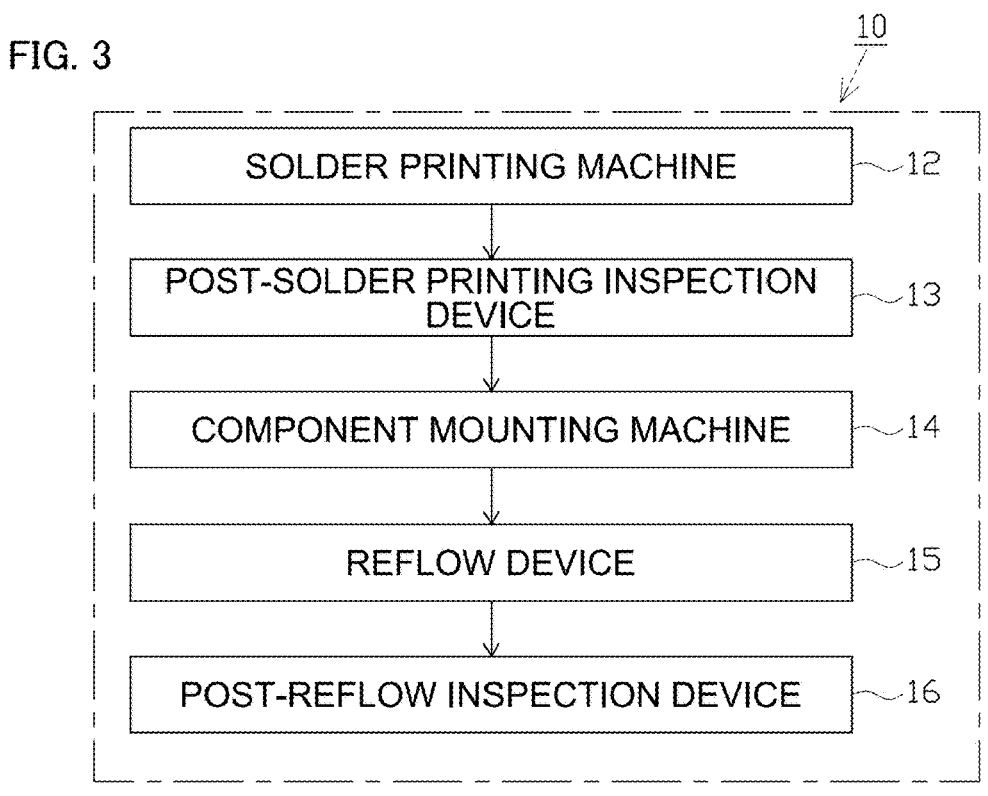
FIG. 3 is a block diagram illustrating the configuration of a manufacturing line of the printed circuit board.

The following describes a manufacturing line (manufacturing process) of manufacturing the printed circuit board 1 with reference to FIG. 3. As shown in FIG. 3, in a manufacturing line 10, a solder printing machine 12, a post-solder printing inspection device 13, a component mounting machine 14, a reflow device 15, and a post-reflow inspection device 16 are placed sequentially from an upstream side thereof (from an upper side of FIG. 3). The printed circuit board 1 is set to be transferred in this sequence along these devices. According to one or more embodiments, the post-solder printing inspection device 13 configures the "board testing apparatus".

The solder printing device 12 performs a solder printing process of printing the solder paste 5 on, for example, the respective lands 3 of the printed circuit board 1. For example, the solder paste 5 is printed by screen printing. A procedure of screen printing first supplies the solder paste 5 onto an upper face of a screen mask in the state that a lower face of the screen mask is brought into contact with the printed circuit board 1. A plurality of openings corresponding to the respective lands 3b of the printed circuit board 1 are formed in the screen mask. The procedure subsequently brings a predetermined squeegee into contact with the upper face of the screen mask and moves the squeegee to fill inside of the openings with the solder paste 5. The procedure then separates the printed circuit board 1 from the lower face of the screen mask, so that the solder paste 5 is applied on the respective lands 3 and is filled in the through holes 3c.

The post-solder printing inspection device 13 performs a post-solder printing inspection process that performs an inspection for the state of the printed solder paste 5 and for the presence or the absence of any foreign substance on the printed circuit board 1. The post-solder printing inspection device 13 will be described later more in detail.

The component mounting machine 14 performs a component mounting process (mounting process) of mounting the component described above, for example, on the lands 3 with the solder paste 5 printed thereon. This causes each of the electrode portions of the component to be temporarily fixed to each predetermined solder paste 5. The component mounting machine 14 is configured to adjust the mounting position of the component according to the positions of the printed solder paste 5.

The reflow device 15 performs a reflow process of heating and fusing the solder paste 5 and solder-joining (soldering) the lands 3 with the electrodes of the component.

The post-reflow inspection device 16 performs a post-reflow inspection process of examining whether the solder-joining is performed appropriately in the reflow process. For example, the post-reflow inspection device 16 examines whether there is any positional misalignment of the component by using image data and the like of the printed circuit board 1 after the reflow process.

Accordingly, the manufacturing line 10 performs the solder printing process, the post-solder printing inspection process, the component mounting process (the mounting process), the reflow process and the post-reflow inspection process in this sequence, while sequentially transferring the printed circuit board 1.

The manufacturing line 10 further includes conveyors or the like provided between the respective devices described above, for example, between the solder printing machine 12 and the post-solder printing inspection device 13, to transfer the printed circuit board 1, although the illustration is omitted. Furthermore, branching units are provided between the post-solder printing inspection device 13 and the component mounting machine 14 and on the downstream side of the post-reflow inspection device 16. The printed circuit board 1 determined as non-defective by the post-solder printing inspection device 13 and by the post-reflow inspection device 16 is guided to downstream, whereas the printed circuit board 1 determined as defective by the post-solder printing inspection device 13 or by the post-reflow inspection device 16 is discharged by the branching unit to a defective storage part (not shown).

Figure 4:
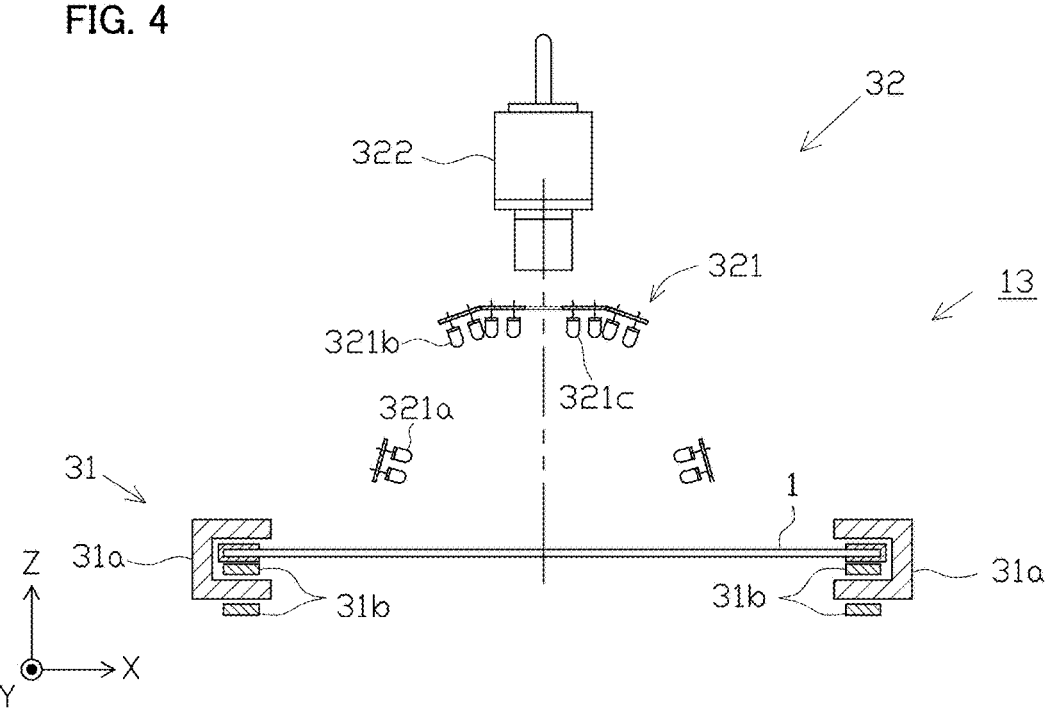
FIG. 4 is a schematic configuration diagram schematically illustrating a post-solder printing inspection device.
Figure 5:
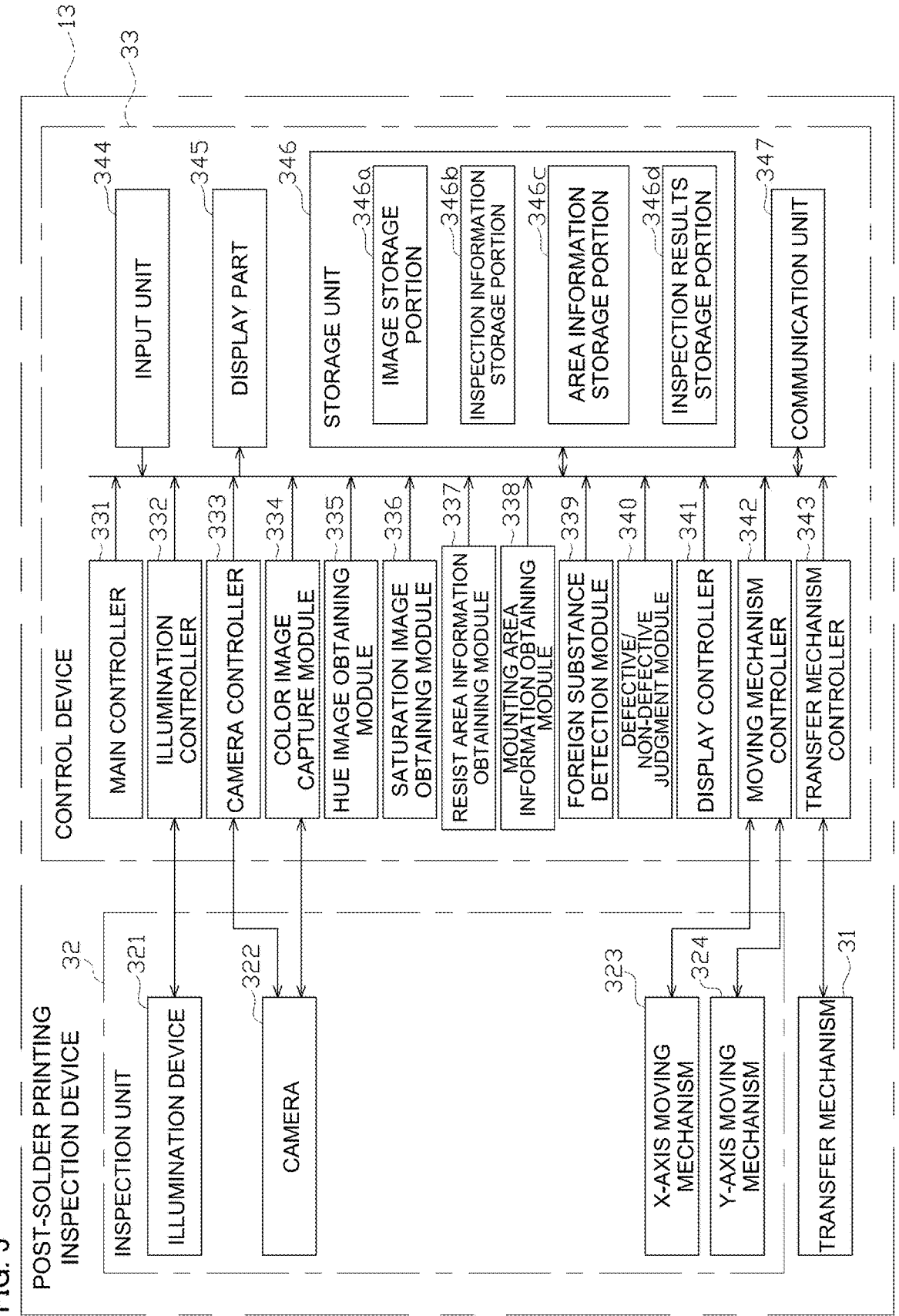
FIG. 5 is a block diagram illustrating the functional configuration of the post-solder printing inspection device.

The following describes the configuration of the post-solder printing inspection device 13 with reference to FIG. 4 and FIG. 5.

As shown in FIG. 4 and FIG. 5, the post-solder printing inspection device 13 includes s a transfer mechanism 31 configured to perform transfer, positioning and the like of the printed circuit board 1, an inspection unit 32 configured to perform an inspection of the printed circuit board 1, and a control device 33 (shown in FIG. 5) configured to perform drive control of the transfer mechanism 31 and the inspection unit 32, as well as various controls, image processing and arithmetic processing in the post-solder printing inspection device 13.

The transfer mechanism 31 includes a pair of transfer rails 31a arranged along a carrying in/out direction of the printed circuit board 1, and an endless conveyor belt 31b placed to be rotatable relative to the respective transfer rails 31a. The transfer mechanism 31 also includes a driving unit, such as a motor, configured to drive the conveyor belt 31b, and a chuck mechanism configured to position the printed circuit board 1 at a predetermined position, although their illustration is omitted. The transfer mechanism 31 is driven and controlled by the control device 33 (a transfer mechanism controller 343 described later).

Under the configuration described above, when the printed circuit board 1 is carried into the post-solder printing inspection device 13, respective side edges of the printed circuit board 1 in a width direction perpendicular to the carrying in/out direction of the printed circuit board 1 are inserted into the transfer rails 31a, and the printed circuit board 1 is placed on the conveyor belt 31b. The conveyor belt 31b subsequently starts operation to transfer the printed circuit board 1 to a predetermined inspection position. When the printed circuit board 1 reaches the inspection position, the conveyor belt 31 stops and the chuck mechanism starts operation. The operation of this chuck mechanism presses up the conveyor belt 31b and causes the respective side edges of the printed circuit board 1 to be clamped by the conveyor belt 31b and upper sides of the transfer rails 31a. This positions and fixes the printed circuit board 1 at the inspection position. When the inspection is terminated, the fixation by the chuck mechanism is released, and the conveyor belt 31b starts operation. This carries out the printed circuit board 1 from the post-solder printing inspection device 13. The configuration of the transfer mechanism 31 is, however, not limited to this configuration described above, but another configuration may be employed for the transfer mechanism 31.

The inspection unit 32 is placed above the transfer rails 31a (above a transfer path of the printed circuit board 1). The inspection unit 32 includes an illumination device 321 and a camera 322. The inspection unit 32 also includes an X-axis moving mechanism 323 configured to allow for motion in an X-axis direction (left-right direction in FIG. 4) and a Y-axis moving mechanism 324 configured to allow for motion in a Y-axis direction (front-rear direction in FIG. 4). The inspection unit 32 is driven and controlled by the control device 33 (a moving mechanism controller 342 described later). According to one or more embodiments, the illumination device 321 and the camera 322 configure the "image obtaining unit (or image obtaining device)".

The illumination device 321 is configured to irradiate the printed circuit board 1 that is an inspection target of the post-solder printing inspection device 13, with predetermined light. More specifically, the illumination device 321 includes a first ring light 321a, a second ring light 321b and a third ring light 321c.

The first ring light 321a is configured to irradiate the printed circuit board 1 as the inspection target with light emitted in an approximately horizontal direction. The second ring light 321b is placed above the first ring light 321a and is configured to irradiate the printed circuit board 1 as the inspection target with light emitted obliquely downward. The third ring light 321c is placed on an inner side of the second ring light 321b and is configured to irradiate the printed circuit board 1 as the inspection target with light emitted almost vertically downward.

Each of the ring lights 321*a*, 321*b* and 321*c* radiates white light to the printed circuit board 1. More specifically, each of the ring lights 321*a*, 321*b* and 321*c* radiates a plurality of color lights, i.e., red light, blue light and green light, at a time to the printed circuit board 1.

The camera 322 is placed such that an optical axis thereof is along a vertical direction (Z-axis direction) and is configured to take an image of a predetermined inspection object area of the printed circuit board 1 as the inspection target from immediate above. The inspection object area is one area among a plurality of areas set in advance in the printed circuit board 1 with the size of an imaging visual field (imaging range) of the camera 322 as one unit. Moreover, the inspection object area includes a component mounting area Ma described later and is set to be wider than the component mounting area Ma. Furthermore, part of each inspection object area is set to partly overlap an adjacent inspection object area.

The camera 322 is configured by a color camera and is operated and controlled by the control device 33 (a camera controller 333 described later). The operation control of the control device 33 (the camera controller 333) causes the camera 322 to take an image of reflected light from the printed circuit board 1 in the state that the printed circuit board 1 is irradiated simultaneously with lights emitted from the respective ring lights 321*a*, 321*b* and 321*c*. This provides a color image of the inspection object area of the printed circuit board 1. This color image has a large number of pixels, and three different types of parameter values with regard to R (red), G (green) and B (blue) are set corresponding to each of the pixels. According to one or more embodiments, these parameter values are respectively expressed in the range of 0 to 1.

The color image taken and obtained by the camera 322 is transferred to the control device 33 (a color image capture module 334 described later). The control device 33 then performs an inspection process, based on this color image. According to one or more embodiments, a process of obtaining a color image by using the camera 322 corresponds to the "image obtaining process".

The control device 33 is configured by a computer including a CPU (Central Processing Unit) configured to perform predetermined arithmetic operations, a ROM (Read Only memory) configured to store various programs, fixed value data and the like, a RAM (Random Access Memory) configured to temporarily store various data in the course of various arithmetic operations, and peripheral circuits thereof.

The operations of the CPU according to the various programs cause the control device 33 to serve as various function modules including a main controller 331, an illumination controller 332, a camera controller 333, a color image capture module 334, a hue image obtaining module 335, a saturation image obtaining module 336, a resist area information obtaining module 337, a mounting area information obtaining module 338, a foreign substance detection module 339, a defective/non-defective judgment module 340, a display controller 341, a moving mechanism controller 342 and a transfer mechanism controller 343. According to one or more embodiments, the hue image obtaining module 335 configures the "hue image obtaining unit". Similarly, the saturation image obtaining module 336 configures the "saturation image obtaining unit"; the resist area information obtaining module 337 configures the "resist area information obtaining unit"; the foreign substance detection module 339 configures the "foreign substance detection unit"; and the defective/non-defective judgment module 340 configures the "defective/non-defective judgment unit".

The various function modules described above are implemented by cooperation of the various hardware components, such as the CPU, the ROM, and the RAM, described above. There is no need to distinctively discriminate the functions implemented by the hardware configuration from the functions implemented by the software configuration. Part or the entirety of these functions may thus be implemented by a hardware circuit, such as an IC. The control device 33 also includes a function module configured to make an inspection for the state of the solder paste 5. This function module is, however, omitted from the configuration of one or more embodiments.

Furthermore, the control device 33 is provided with, for example, an input unit (or an input device) 344 configured by, for example, a keyboard and a mouse, a touch panel or the like, a display part (or a display) 345 provided with a display screen and configured by, for example, a liquid crystal display or the like, a storage unit (or a storage device) 346 configured to store various data and programs, results of arithmetic operations, results of inspection and the like, and a communication unit (or a communication interface) 347 configured to send and receive various data to and from outside. According to one or more embodiments, the display part 345 configures the "display unit". The storage unit 346 and the communication unit 347 are described first.

The storage unit 346 is configured by, for example, an HDD (Hard Disk Drive), an SSD (Solid State Drive) or the like to store various pieces of information. The storage unit 346 includes an image storage portion (or an image storage) 346*a*, an inspection information storage portion (or an inspection information storage) 346*b*, an area information storage portion (or an area information storage) 346*c*, and an inspection results storage portion (or an inspection results storage) 346*d*.

The image storage portion 346*a* stores color images taken and obtained by the camera 322. The image storage portion 346*a* also stores, for example, hue images and saturation images respectively obtained by the hue image obtaining module 335 and by the saturation image obtaining module 336 as described later. The color images, the hue images, the saturation images and the like stored in the image storage portion 346*a* may be displayed appropriately on the display part 345 by the display controller 341.

The inspection information storage portion 346*b* stores various pieces of information that are used for an inspection of the printed circuit board 1. For example, the inspection information storage portion 346*b* stores, for example, a plurality of threshold values (a hue threshold value and a saturation threshold value) used for processing a hue image and a saturation image by a binarization process, a reference value (an area specifying reference value) used for determining whether a part is the resist area 4 or not, and an area threshold value and a length threshold value used for determining whether a detected object is a foreign substance. The length threshold value is set to, for example, a value corresponding to 100 µm.

The area information storage portion 346*c* stores resist area information obtained by the resist area information obtaining module 337. The area information storage portion 346*c* also stores component mounting area information obtained by the mounting area information obtaining module 338.

The inspection results storage portion 346*d* stores data with regard to results of foreign substance detection by the foreign substance detection module 339 and inspection results data with regard to defective or non-defective of a foreign substance by the defective/non-defective judgment module 340. The inspection results storage portion 346*d* also stores inspection results data with regard to the state of the solder paste 5, as well as statistical data obtained by processing various inspection results data statistically. These inspection results data and statistical data may be displayed appropriately on the display part 345 by the display controller 341.

The following describes the above various function modules configuring the control device 33 in detail. The moving mechanism controller 342 and the transfer mechanism controller 343 are described first, and the main controller 331 and the others are described next.

The moving mechanism controller 342 is a function module configured to drive and control the X-axis moving mechanism 323 and the Y-axis moving mechanism 324 and serves to control the position of the inspection unit 32, in response to a command signal from the main controller 331. The moving mechanism controller 342 drives and controls the X-axis moving mechanism 323 and the Y-axis moving mechanism 324 to move the inspection unit 32 to a position above an arbitrary inspection object area in the printed circuit board 1 positioned and fixed at an inspection position. The configuration of successively moving the inspection unit 32 to a plurality of inspection object areas set on the printed circuit board 1 as the inspection target and performing inspections with regard to the respective inspection object areas completes inspection of the entire area of the printed circuit board 1.

The transfer mechanism controller 343 is a function module configured to drive and control the transfer mechanism 31 and serves to control the transfer position of the printed circuit board 1 as the inspection target, in response to a command signal from the main controller 331.

The following describes the main controller 331 and the others. The main controller 331 is a function module responsible for the control of the entire post-solder printing inspection device 13 and is configured to send and receive various signals to and from other function modules such as the illumination controller 332 and the camera controller 333.

The illumination controller 332 is a function module configured to drive and control the illumination device 321. The illumination controller 332 performs, for example, timing control with regard to irradiation and stop of irradiation of the printed circuit board 1 with the light emitted from the illumination device 321, in response to a command signal from the main controller 331.

The camera controller 333 is a function module configured to drive and control the camera 322. The camera controller 333 controls, for example, the imaging timing of the printed circuit board 1 by the camera 322, in response to a command signal from the main controller 331.

The color image capture module 334 is a function module configured to capture the color image taken and obtained by the camera 322. The color image captured by the camera image capture module 334 is stored into the image storage portion 346*a*.

Figure 6:
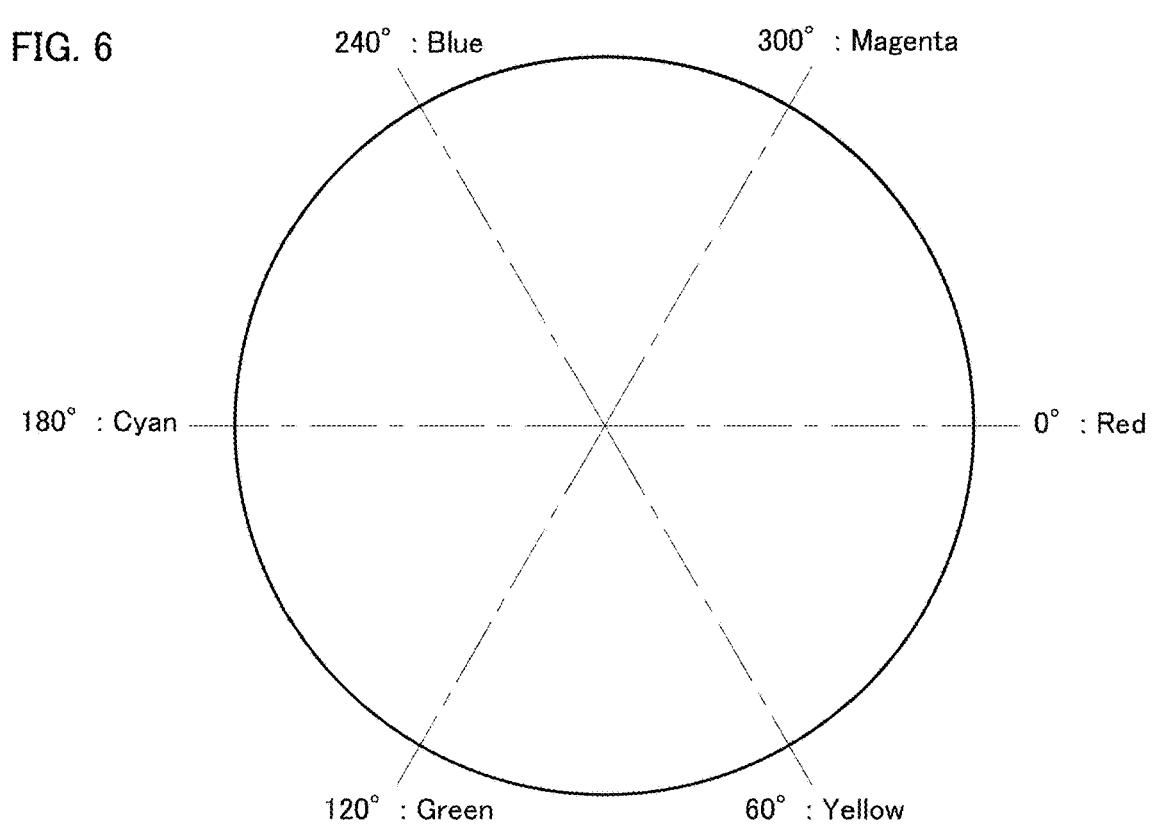
FIG. 6 is a diagram illustrating a color circle of an HSV color space in a simplified manner.
Figure 9:
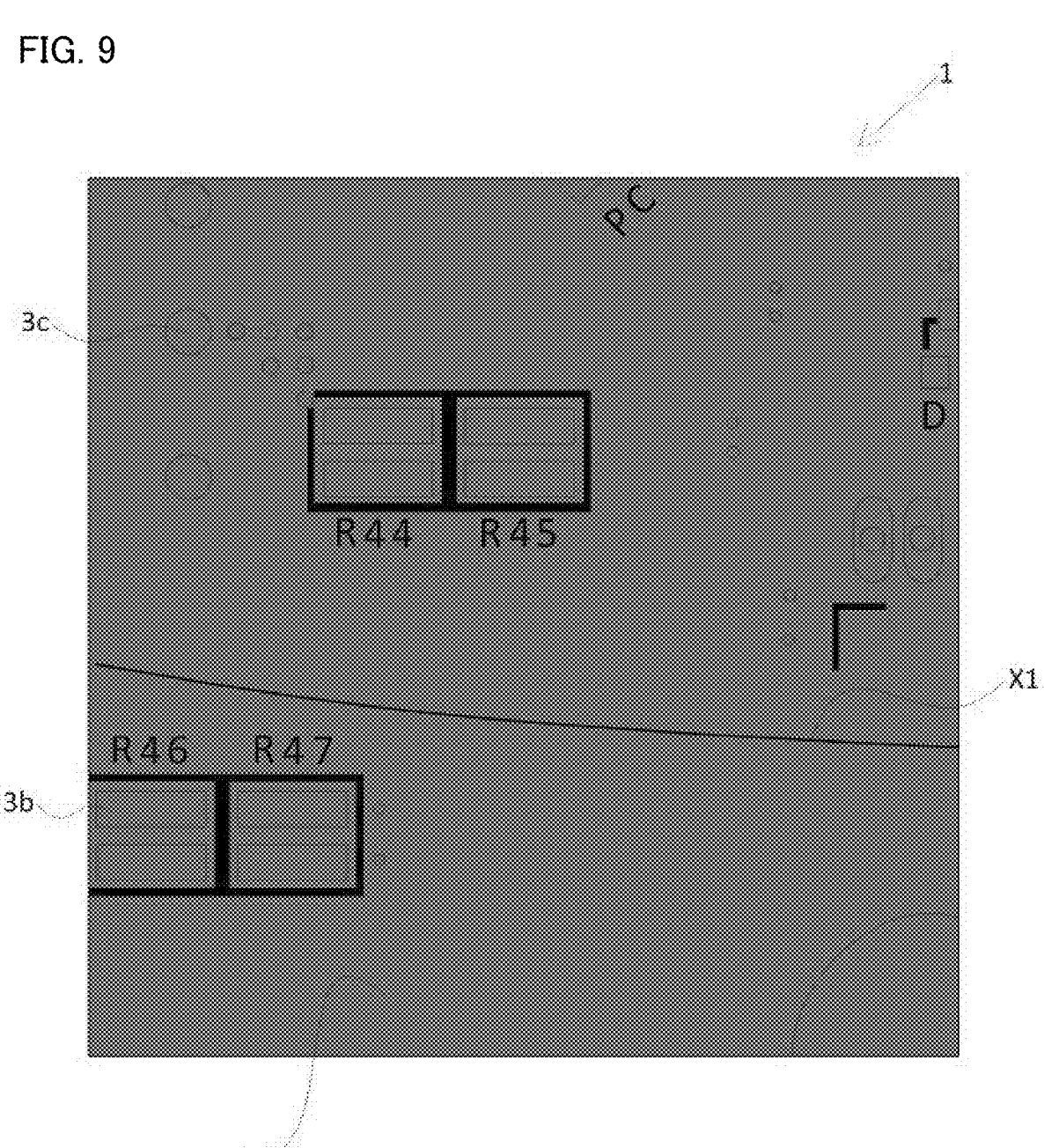
FIG. 9 is a diagram illustrating a hue image of an inspection object board with blond hair adhering thereto.
Figure 10:
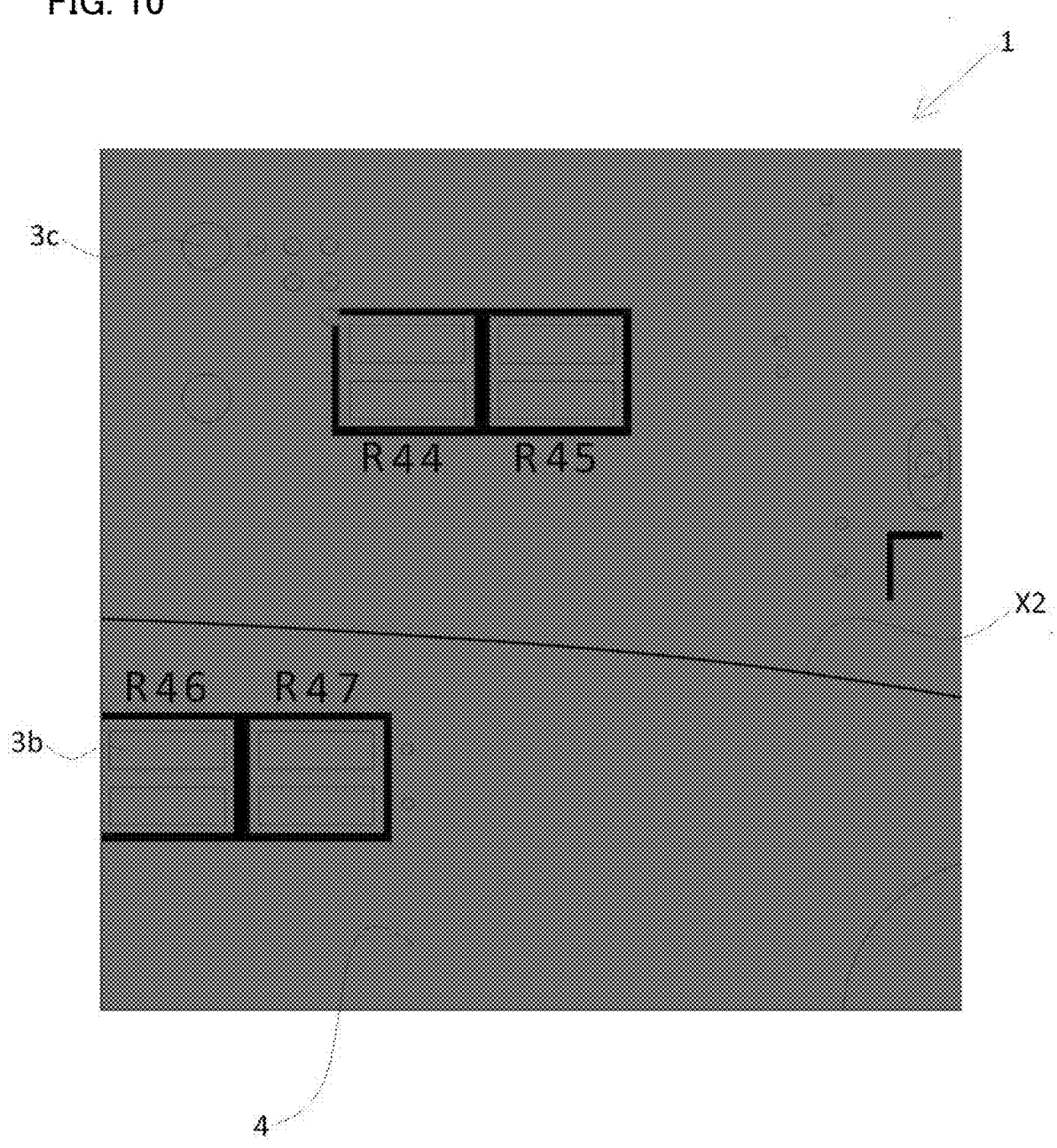
FIG. 10 is a diagram illustrating a hue image of the inspection object board with brown hair adhering thereto.

The hue image obtaining module 335 uses the color image of the inspection object area of the printed circuit board 1 stored in the image storage portion 346*a* to obtain a hue image of the inspection object area of the printed circuit board 1. The hue image is an image indicating hues in a color circle of an HSV color space with regard to respective pixels in the color image. FIG. 9 and FIG. 10 show examples of hue images. The hue image obtaining module 335 determines hues Hue (hereinafter referred to as "hues H") of the respective pixels in the color circle of the HSV color space (shown in FIG. 6) with 0 degree (360 degrees) as red, 60 degrees as yellow, 120 degrees as (strict) green, 180 degrees as cyan, 240 degrees as blue, and 300 degrees as magenta and obtains a hue image in which hues H are related to respective pixels. According to one or more embodiments, a process of obtaining a hue image of the printed circuit board 1 by the hue image obtaining module 335 corresponds to the "hue image obtaining process". The hue image is stored in the image storage portion 346*a*.

The hue H is calculated by using Mathematical Expression 1, Mathematical Expression 2 or Mathematical Expression 3 given below. Mathematical Expression 1 is used when a parameter value of B is a maximum value among respective parameter values of R, G and B. Mathematical Expression 2 is used when the parameter value of R is a maximum value among the respective parameter values of R, G and B. Mathematical Expression 3 is used when the parameter value of G is a maximum value among the respective parameter values of R, G and B. In the case where the maximum value and the minimum value out of the respective parameter values of R, G and B are equal to each other, however, no hue H is defined:

$$H = 60 \times (G - R)/(\text{MAX} - \text{MIN}) + 60 \qquad \text{⟨Mathematical Expression 1⟩}$$

$$H = 60 \times (B - G)/(\text{MAX} - \text{MIN}) + 180 \qquad \text{⟨Mathematical Expression 2⟩}$$

$$H = 60 \times (R - B)/(\text{MAX} - \text{MIN}) + 300 \qquad \text{⟨Mathematical Expression 3⟩}$$

In Mathematical Expressions 1 to 3, R, G, and B respectively represent the respective parameter values of R, G and B; MAX represents a maximum value out of the respective parameter values; and MIN represents a minimum value out of the respective parameter values.

Figure 11:
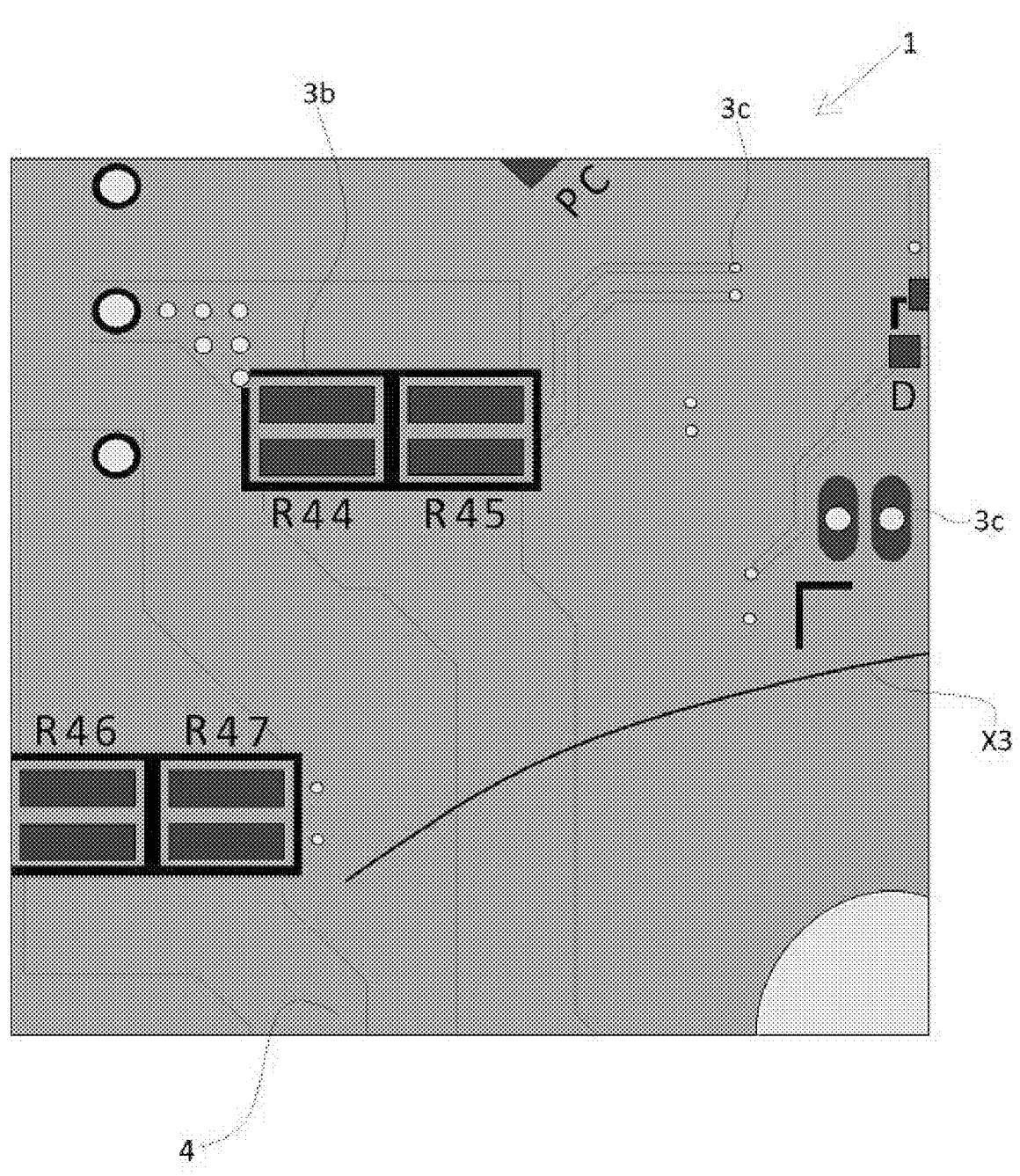
FIG. 11 is a diagram illustrating a saturation image of the inspection object board with black hair adhering thereto.
Figure 12:
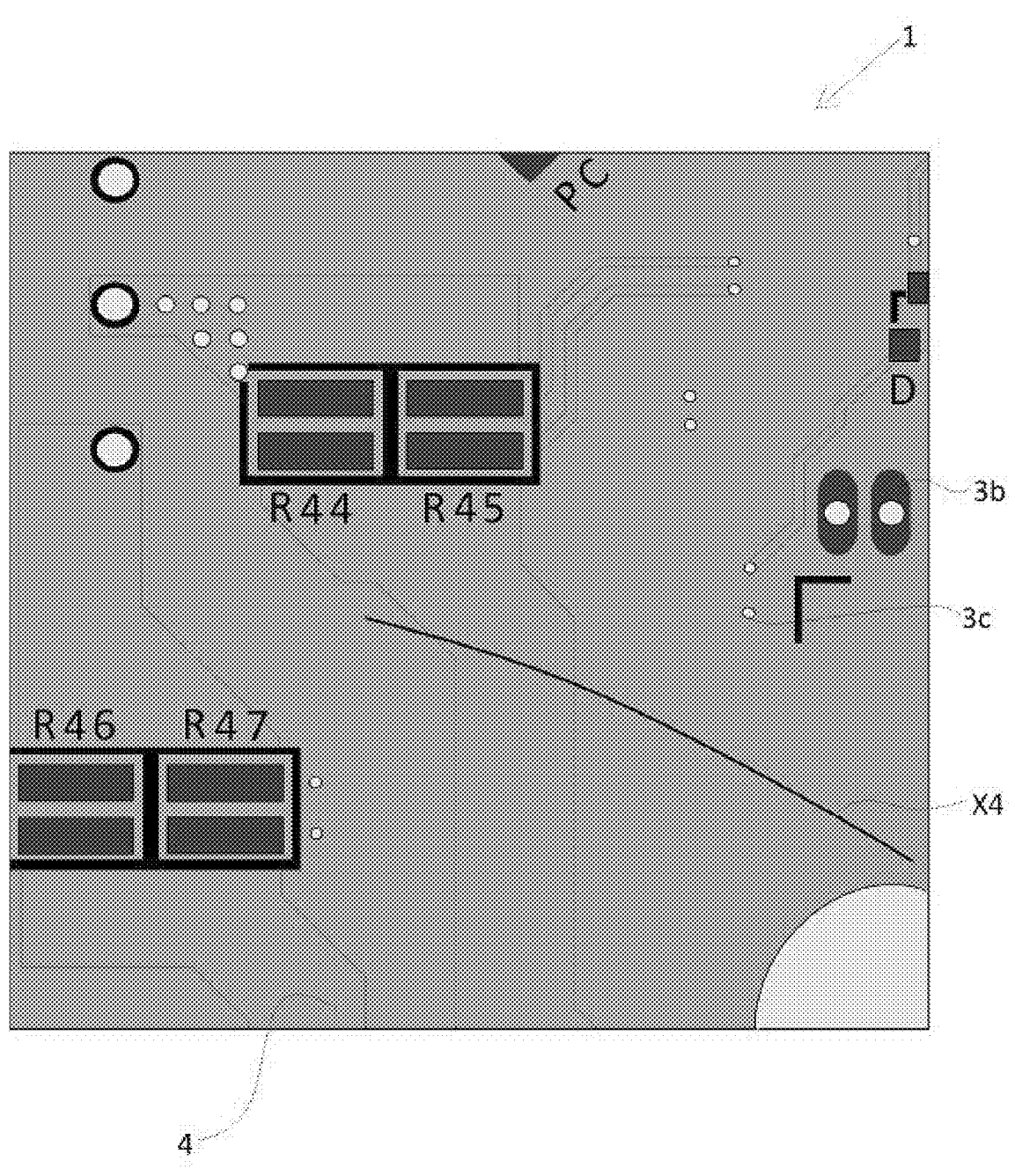
FIG. 12 is a diagram illustrating a saturation image of the inspection object board with gray hair adhering thereto.

The saturation image obtaining module 336 uses the color image of the inspection object area of the printed circuit board 1 stored in the image storage portion 346*a* to obtain a saturation image of the inspection object area of the printed circuit board 1. The saturation image is an image indicating saturations of respective pixels in the color image. FIG. 11 and FIG. 12 show examples of saturation images. The saturation image obtaining module 336 uses Mathematical Expression 4 given below to calculate saturations S (saturations in the HSV system) of the respective pixels in the color image and obtains a saturation image in which saturations S are related to respective pixels. According to one or more embodiments, a process of obtaining a saturation image of the printed circuit board 1 by the saturation image obtaining module 336 corresponds to the "saturation image obtaining process". The saturation image is stored in the image storage portion 346*a*:

$$S = (1 - 3 \times \text{MIN}/(R + G + B)) \qquad \text{⟨Mathematical Expression 4⟩}$$

Like Mathematical Expressions 1 to 3, in Mathematical Expression 4, R, G, and B respectively represent the respective parameter values of R, G and B; and MIN represents a minimum value out of the respective parameter values. The saturations S of the respective pixels in the saturation image are expressed by the values of 0 to 1. The saturation S of a pixel closer to 1 indicates that the color of the pixel is closer to the primary color. The saturations S may be determined according to Mathematical Expression 4a given below, in place of Mathematical Expression 4:

$$S = (MAX - MIN)/MAX \qquad \text{(Mathematical Expression 4a)}$$

The resist area information obtaining module 337 obtains resist area information in order to specify a range occupied by the resist area 4 in the printed circuit board 1. According to one or more embodiments, the resist area information obtaining module 337 obtains resist area information, based on the printed circuit board 1 as the inspection target.

More specifically, the resist area information obtaining module 337 obtains a hue image similar to the hue image described above, based on the color image. The hue image obtained by the hue image obtaining module 335 may be used here.

The resist area information obtaining module 337 subsequently performs a process of specifying linkage component of pixels in the hue image that have the hues H in a predetermined range (for example, not less than 70 degrees and not greater than 160 degrees according to one or more embodiments) and calculates an area (the number of pixels according to one or more embodiments) of the specified linkage components (lump part). Accordingly, the resist area information obtaining module 337 calculates the area of a lump part that has green color or a color close to green in the color image.

The resist area information obtaining module 337 subsequently compares the area of the lump part with the area specifying reference value stored in advance in the inspection information storage portion 346b and determines that the lump part having the area greater than the area specifying reference value is the resist area 4. The resist area information obtaining module 337 then obtains information for specifying this resist area 4 (for example, coordinate information indicating the position of the resist area 4), as resist area information. The obtained resist area information is stored in the area information storage portion 346c. According to one or more embodiments, a process of obtaining the resist area information by the resist area information obtaining module 337 corresponds to the "resist area information obtaining process".

The mounting area information obtaining module 338 obtains mounting area information in order to specify a "component mounting area" with regard to the printed circuit board 1. The "component mounting area" denotes an area including an "area where a component is possibly mounted on", lands 3 that are not covered by the resist but are exposed, and solder paste 5 or an adhesive. The "area where a component is possibly mounted on" basically indicates a "reference mounting position of a component". In the application of self-alignment, however, the "area where a component is possibly mounted on" includes expected mounting positions of the component that are offset corresponding to self-alignment. Self-alignment is an action that the solder paste 5 fused in the reflow process wets and spreads along the surface of the land 3b. The action of self-alignment may cause the solder plate 5 to be eventually placed on the land 3b without significant misalignment through the reflow process described above, even when the solder paste 5 is printed at a position deviated from the land 3b. The "reference mounting position of a component" may be strictly set by using design information and manufacture information or may be set by a simplified method using the position of the land 3b and the like.

Figure 7:
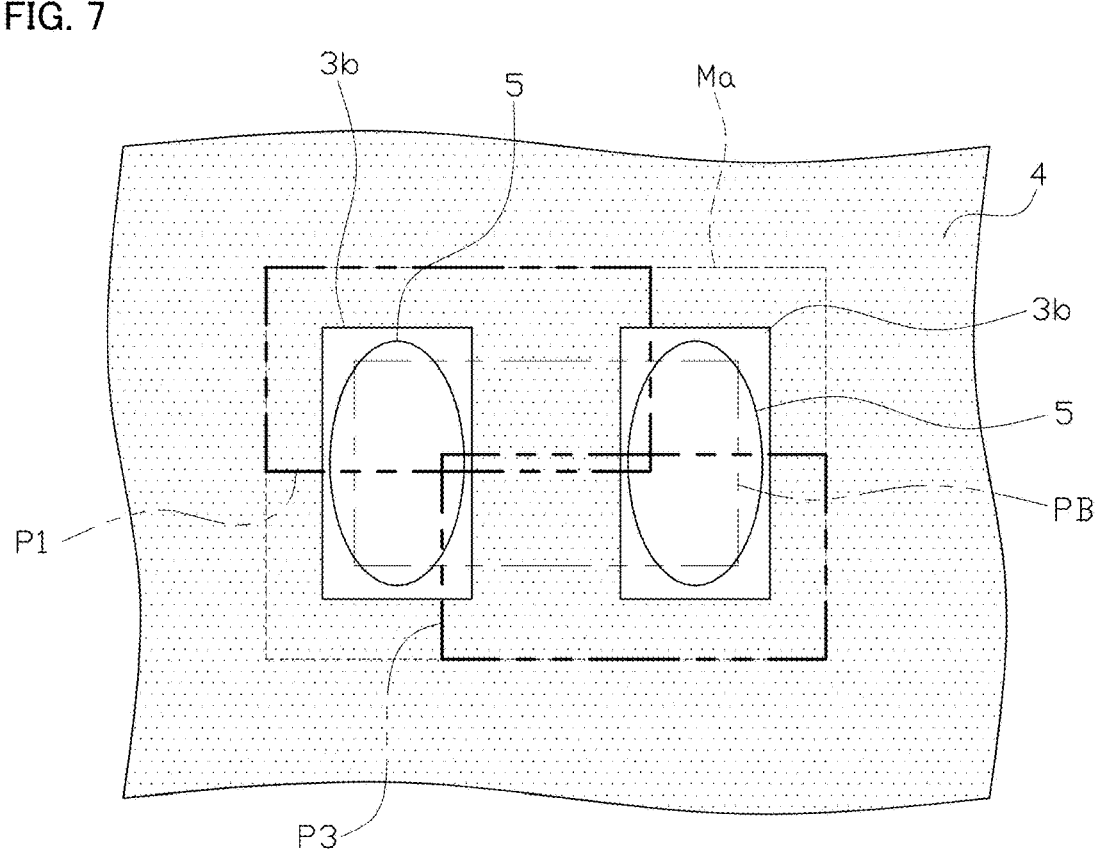
FIG. 7 is a schematic view illustrating a component mounting area and others.
Figure 8:
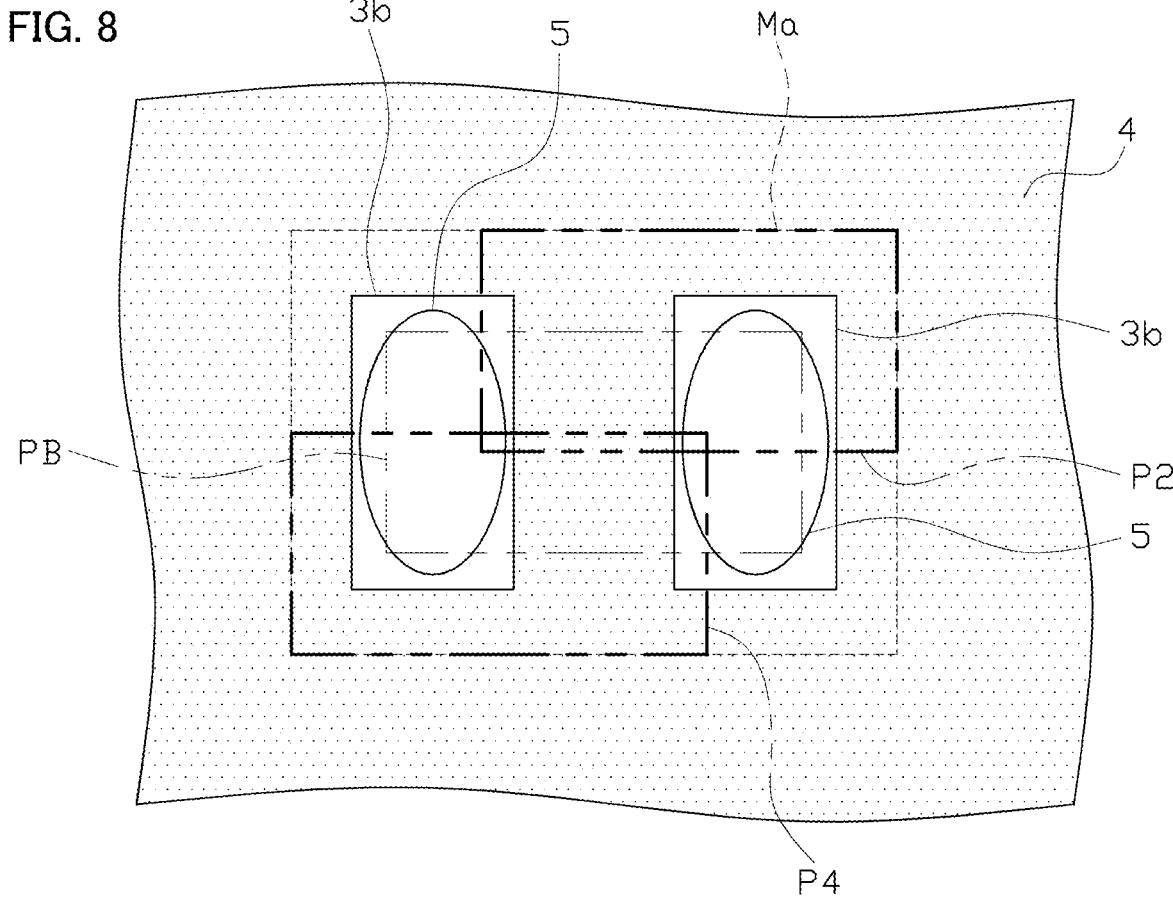
FIG. 8 is a schematic view illustrating a component mounting area and others.

According to one or more embodiments, for example, as shown in FIG. 7 and FIG. 8, when expected mounting positions of a component that are most offset corresponding to the self-alignment are positions P1, P2, P3 and P4 (positions shown by thick two-dot chain lines in FIG. 7 and FIG. 8), a rectangular area, which includes a reference mounting position of a component PB (a position shown by a thin two-dot chain line in FIG. 7 and FIG. 8), the positions P1 to P4, the lands 3b as mounting targets of the component and the solder pastes 5 which the components is mounted on, is set as a component mounting area Ma. The "component mounting area" is not limited to a minimum area including the "area where a component is possibly mounted on", the lands 3b and the solder pastes 5 or the adhesive but may be an area specified by appropriately expanding the minimum area. In the examples of FIG. 7 and FIG. 8, the "area where a component is possibly mounted on" is a minimum area including the positions P1 to P4 and the reference mounting position PB.

According to one or more embodiments, for example, the mounting area information obtaining module 338 uses information showing a positional relationship between the resist area information in design and the component mounting area to obtain a range of coordinates (coordinates indicating the positions of pixels) having a relationship to the obtained resist area information equivalent to this positional relationship, as the mounting area information. The information showing the positional relationship is stored in advance in the inspection information storage portion 346b. The obtained mounting area information is stored into the area information storage portion 346c.

The foreign substance detection module 339 detects a foreign substance with setting the inspection target to the resist area 4 specified by the resist area information in a hue image or in a saturation image of the inspection object area.

The detection of a foreign substance based on the hue image uses a hue difference relative to the resist area 4. More specifically, the foreign substance detection module 339 first obtains a binarized hue image by binarizing the respective pixels in the hue image of the inspection object area in relation to a hue component. According to one or more embodiments, the binarized hue image is obtained by comparing the hue threshold value stored in advance in the inspection information storage portion 346b with the hues H of the respective pixels in the hue image and binarizing the respective pixels in the hue image. The obtained binarized hue image is a black and white image including 0 (light portion) and 1 (dark portion). The binarized hue image is stored in the image storage portion 346a.

A hue image of the printed circuit board 1 with a blond hair X1 adhering thereto (refer to FIG. 9) and a hue image of the printed circuit board 1 with a brown hair X2 adhering thereto (refer to FIG. 10) are shown for the purpose of reference. As shown in these drawings, in the hue images, the respective hues of the blond hair X1 and the brown hair X2 are sufficiently different from the hue of the resist area 4 for the purpose of an inspection. Accordingly, in the binarized hue images, for example, the blond hair X1 and the brown hair X2 are shown as dark portions and the resist area 4 is shown as a light portion.

After obtaining the binarized hue image, the foreign substance detection module 339 sets the resist area 4 specified at least according to the resist area information obtained by the resist area information obtaining module 337, in this binarized hue image, as an inspection target (inspection range). This excludes, for example, the lands 3b, the through holes 3c, and a letter or character part and a graphic part applied on the printed circuit board 1, from the inspection target (inspection range). According to one or more embodiments, the resist area information and the hue image are obtained, based on an identical printed circuit board 1 that is the inspection target, so that an optimum inspection target is set for this printed circuit board 1.

The foreign substance detection module 339 subsequently performs a process of specifying a linkage component of pixels (for example, dark portion) having hues different from the hue of the resist area 4 (for example, light portion), in the inspection target (inspection range) and calculates an area (for example, the number of pixels) of the specified linkage component (lump part). The foreign substance detection module 339 also calculates a length (for example, an X-direction length and a Y-direction length) of the linkage component (lump part).

The foreign substance detection module 339 subsequently compares the area of the lump part with the area threshold value stored in advance in the inspection information storage portion 346*b*. When the area of the lump part is greater than the area threshold value, the foreign substance detection module 339 determines that a foreign substance is present. The foreign substance detection module 339 also compares the length of the lump part with the length threshold value stored in advance in the inspection information storage portion 346*b*. When the length of the lump part is greater than the length threshold value, the foreign substance detection module 339 determines that a foreign substance is present. In the case where a foreign substance is present, the foreign substance detection module 339 stores foreign substance location information for specifying the position of this foreign substance (for example, coordinates information indicating the position of the foreign substance) into the inspection results storage portion 346*d*.

When the area of the lump part is not greater than the area threshold value and the length of the lump part is not greater than the length threshold value, on the other hand, the foreign substance detection module 339 determines that no foreign substance is present.

Furthermore, the foreign substance detection module 339 performs a process of detecting a foreign substance similar to the process described above, based on the saturation image of the inspection object area, as well as the hue image. The detection of a foreign substance based on the saturation image uses a saturation difference relative to the resist area 4.

More specifically, the foreign substance detection module 339 first obtains a binarized saturation image by binarizing the respective pixels in the saturation image in relation to a saturation component. According to one or more embodiments, the binarized saturation image is obtained by comparing the saturation threshold value stored in advance in the inspection information storage portion 346*b* with the saturations S of the respective pixels in the saturation image and binarizing the respective pixels in the saturation image. The obtained binarized saturation image is a black and white image including 0 (dark portion) and 1 (light portion). The binarized saturation image is stored in the image storage portion 346*a*.

A saturation image of the printed circuit board 1 with a black hair X3 adhering thereto (refer to FIG. 11) and a saturation image of the printed circuit board 1 with a gray hair X4 adhering thereto (refer to FIG. 12) are shown for the purpose of reference. As shown in these drawings, the saturation images, the respective saturations of the black hair X3 and the gray hair X4 are sufficiently different from the saturation of the resist area 4 for the purpose of an inspection. Accordingly, in the binarized saturation images, for example, the black hair X3 and the gray hair X4 are shown as dark portions and the resist area 4 is shown as a light portion.

After obtaining the binarized saturation image, the foreign substance detection module 339 sets the resist area 4 specified at least according to the resist area information obtained by the resist area information obtaining module 337, in this binarized saturation image, as an inspection target (inspection range).

The foreign substance detection module 339 subsequently performs a process of specifying a linkage component of pixels (for example, dark portion) having saturations different from the saturation of the resist area 4 (for example, light portion), in the inspection target (inspection range) and calculates an area and a length of the specified linkage component (lump part).

The foreign substance detection module 339 subsequently compares the area of the lump part with the area threshold value and compares the length of the lump part with the length threshold value. When the area of the lump part is greater than the area threshold value or when the length of the lump part is greater than the length threshold value, the foreign substance detection module 339 determines that a foreign substance is present. The foreign substance location information (for example, the coordinates information) with regard to the detected foreign substance is stored into the inspection results storage portion 346*d*.

The foreign substance detection module 339 may determine that a foreign substance is present, when the area of the lump part is greater than the area threshold value and the length of the lump part is greater than the length threshold value. Another configuration may determine whether a foreign substance is present or not by using parameters other than the area and the length (for example, a thickness or a shape).

When the area of the lump part is not greater than the area threshold value and the length of the lump part is not greater than the length threshold value, on the other hand, the foreign substance detection module 339 determines that no foreign substance is present.

The foreign substance detection module 339 performs the process of detecting a foreign substance based on the hue images or based on the saturation images with regard to all the inspection object areas of the printed circuit board. More specifically, the foreign substance detection module 339 performs the process of detecting a foreign substance described above by using all the hue images or all the saturation images with regard to the printed circuit board 1 that is the inspection target. The results of foreign substance detection with regard to all the inspection object areas are stored into the inspection results storage portion 346*d*. According to one or more embodiments, the process of detecting a foreign substance by the foreign substance detection module 339 corresponds to the "foreign substance detection process."

The defective/non-defective judgment module 340 determines whether a foreign substance is defective or non-defective, based on the positional relationship of the foreign substance detected by the foreign substance detection module 339 to the component mounting area Ma. According to one or more embodiments, the defective/non-defective judgment module 340 determines that the foreign substance is "defective" when the foreign substance detected by the foreign substance detection module 339 overlaps the component mounting area Ma or is adjacent to the component mounting area Ma.

More specifically, the defective/non-defective judgment module 340 determines whether at least one among a plurality of coordinates specified by the foreign substance location information is included in a range of coordinates specified by the mounting area information, in an inspection object area, based on the foreign substance location information and the mounting area information stored in the storage portions 346*c* and 346*d*. In the case where at least one among the plurality of coordinates with regard to the foreign substance is included in the range of coordinates with regard to the mounting area information Ma, the defective/non-defective judgment module 340 determines that the foreign substance is "defective".

Figure 13:
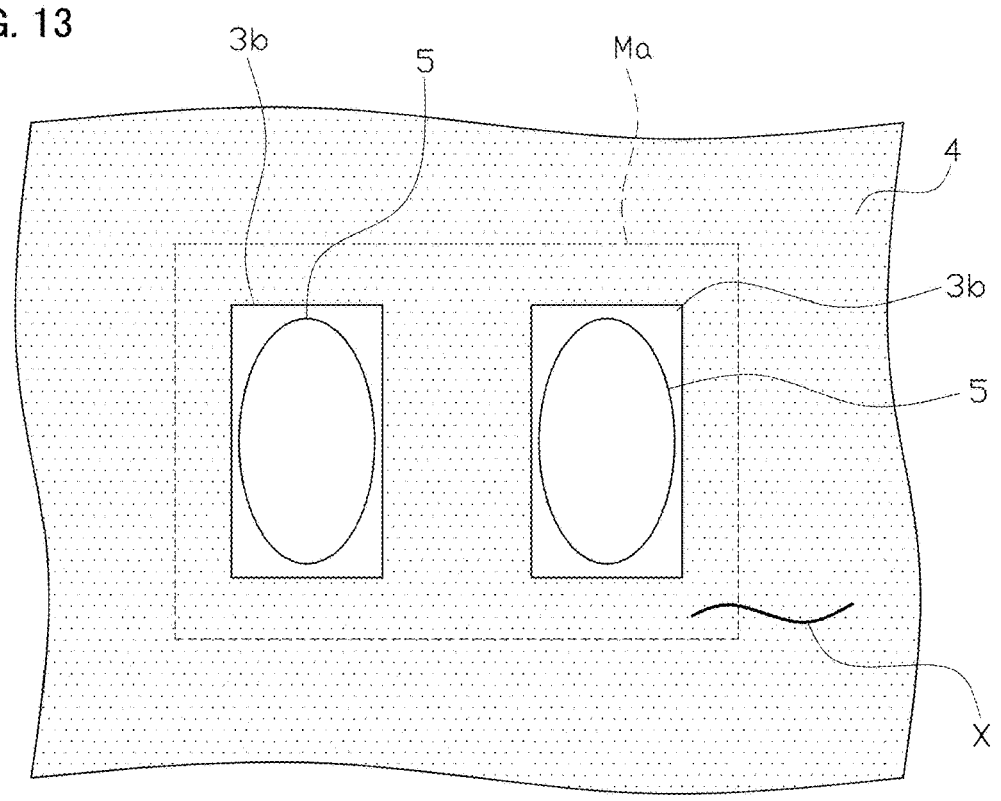
FIG. 13 is a schematic view illustrating a foreign substance that overlaps a component mounting area and that is detected as defective.
Figure 14:
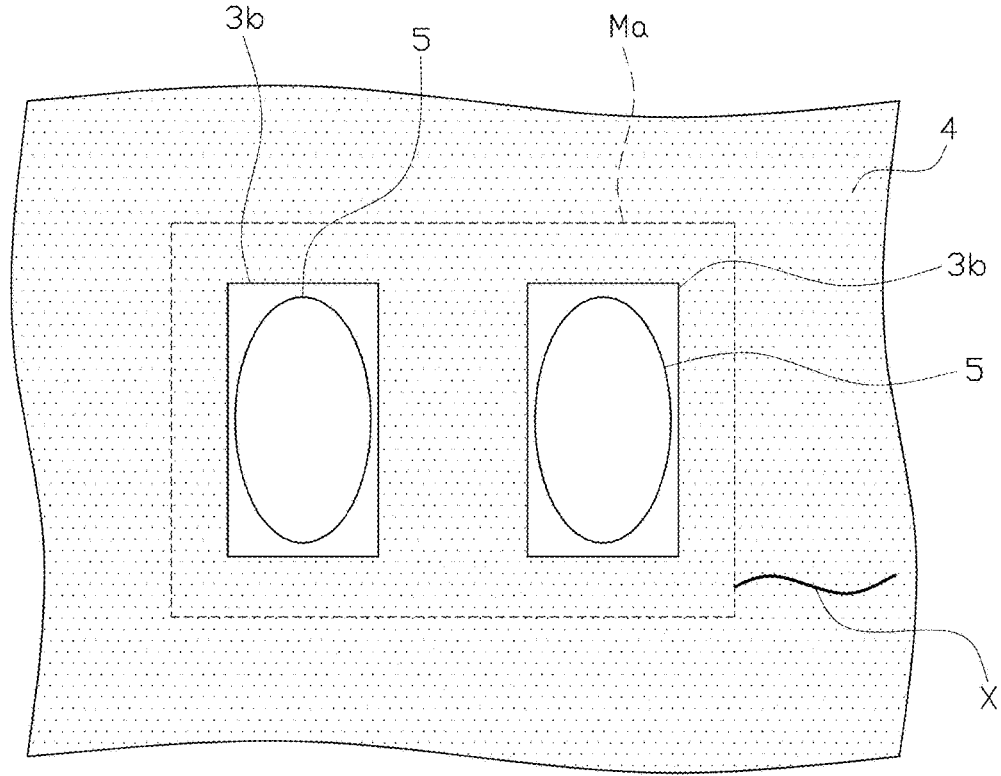
FIG. 14 is a schematic view illustrating a foreign substance that is adjacent to a component mounting area and that is detected as defective.

For example, as shown in FIG. 13, when a foreign substance X overlaps the component mounting area Ma, a plurality of coordinates with regard to the foreign substance are included in a range of coordinates with regard to the component mounting area Ma. The defective/non-defective judgment module 340 accordingly determines that the foreign substance X is "defective". In another example, as shown in FIG. 14, when a foreign substance X is adjacent to the component mounting area Ma, at least one of a plurality of coordinates with regard to the foreign substance is included in a range of coordinates with regard to the component mounting area Ma. The defective/non-defective judgment module 340 accordingly determines that the foreign substance is "defective".

When all the plurality of coordinates with regard to the foreign substance are not included in the range of coordinates with regard to the mounting area information Ma, on the other hand, the defective/non-defective judgment module 340 determines that the foreign substance is "non-defective". The results of determination by the defective/non-defective judgment module 340 are related to the foreign substance location information and are stored in the inspection results storage portion 346*d*.

Furthermore, the defective/non-defective judgment module 340 performs the above inspection process to determine the defective or non-defective of a foreign substance with regard to all the inspection object areas of the printed circuit board 1 as the target. When no foreign substance is detected by the foreign substance detection module 339 or when a detected foreign substance is determined to be "non-defective" with regard to all the inspection object areas of the printed circuit board 1, the defective/non-defective judgment module 340 determines that the printed circuit board 1 that is the inspection target is non-defective.

When a foreign substance is detected by the foreign substance detection module 339 and there is any inspection object area having the foreign substance determined to be "defective", on the other hand, the defective/non-defective judgment module 340 determines that the printed circuit board 1 that is the inspection target is defective. The results of determination by the defective/non-defective judgment module 340 are stored into the inspection results storage portion 346*d*. These results of determination are also notified to the outside via the display part 345 and the communication unit 347. According to one or more embodiments, the process of determining whether a foreign substance is defective or non-defective by the defective/non-defective judgment module 340 corresponds to the "defective/non-defective judgment process".

When the information stored in the storage unit 346 is to be displayed on the display part 345, the display controller 341 controls the contents of the display. According to one or more embodiments, the display controller 341 uses the information stored in the storage unit 346 and enables a superimposed image (for example, an image shown in FIG. 13 or an image shown in FIG. 14), which is created by superimposing an image corresponding to the component mounting area M (for example, an image of a frame indicating an outer edge of the component mounting area Ma) on an image (a hue image, a saturation image or a color image) of an inspection object area where a foreign substance is detected by the foreign substance detection module 339, to be displayed on the display part 345. In other words, the display controller 341 enables an image showing a positional relationship between the foreign substance detected by the foreign substance detection module 339 and the component mounting area Ma to be displayed on the display part 345.

Figure 15:
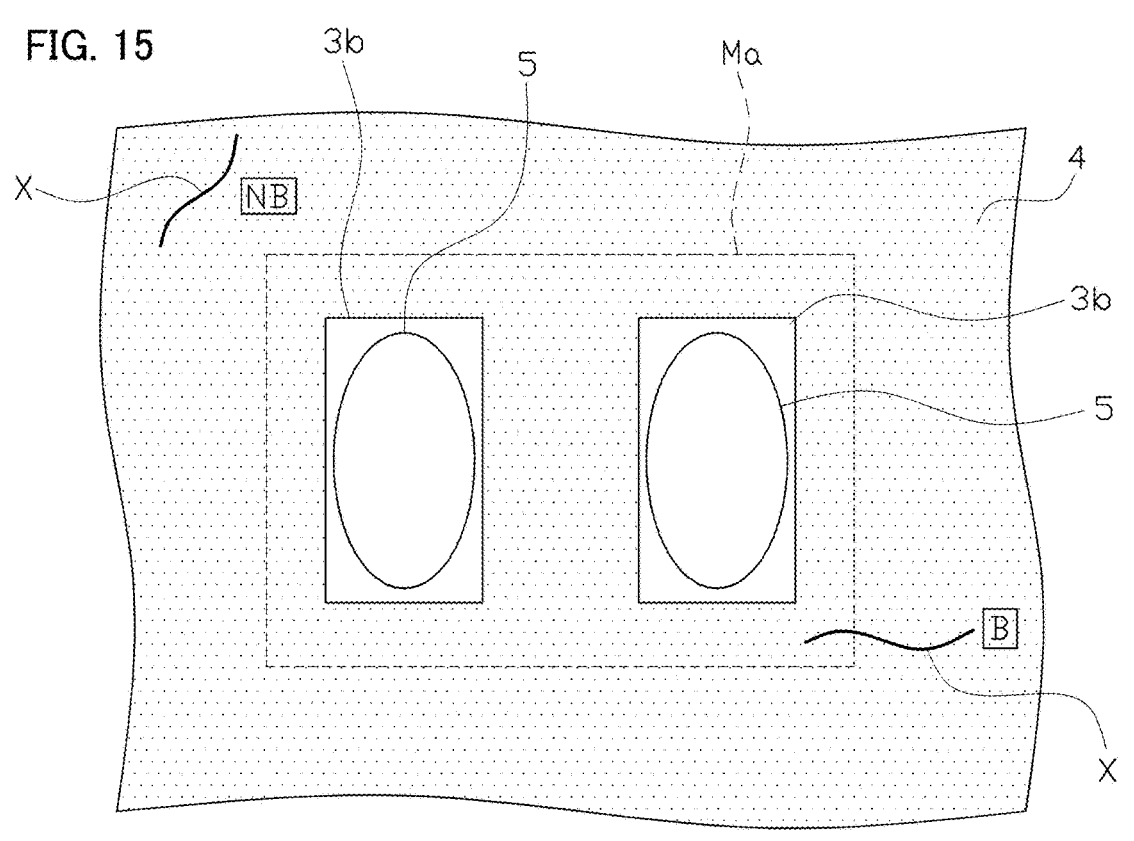
FIG. 15 is a schematic view illustrating an image displayed according to one or more embodiments.

Furthermore, the display controller 341 enables the foreign substance that is determined as "defective" by the defective/non-defective judgment module 340 and the foreign substance that is determined as "non-defective" by the defective/non-defective judgment module 340, out of the foreign substances detected by the foreign substance detection module 339, to be displayed in a distinguishable manner on the display part 345. According to one or more embodiments, for example, as shown in FIG. 15, information indicating "defective" (for example, a letter of "B") is displayed corresponding to the foreign substance X determined to be "defective" by the defective/non-defective judgment module 340. Information indicating "non-defective" (for example, a letter of "NB") is, on the other hand, displayed corresponding to the foreign substance X determined to be "non-defective" by the defective/non-defective judgment module 340.

As described above in detail, even in the event of detection of a foreign substance X, when it is expected that this foreign substance X does not cause any functional problem on the printed circuit board 1, based on the positional relationship of the foreign substance X to the component mounting area Ma, the configuration of one or more embodiments causes such a foreign substance to be determined as non-defective. This configuration reliably prevents defective determination of the printed circuit board 1 due to the presence of a foreign substance that is expected to cause no functional problem on the printed circuit board 1. As a result, this configuration reduces the number of printed circuit boards 1 that are determined as defective and that are discarded and thereby improves the yield.

When it is expected that a detected foreign substance possibly causes a functional problem on the printed circuit board 1, based on the positional relationship of the foreign substance to the component mounting area Ma, on the other hand, the configuration of one or more embodiments causes such a foreign substance to be determined as defective. This configuration appropriately detects a foreign substance that possibly causes a functional problem on the printed circuit board 1 and more reliably prevents erroneous determination of the printed circuit board 1 as non-defective.

The configuration of one or more embodiments determines a foreign substance as defective in the case where the foreign substance overlaps the component mounting area Ma or is adjacent to the component mounting area Ma. Accordingly, this configuration enables the determination of whether each foreign substance is a defective foreign substance that possibly causes a functional problem on the printed circuit board 1, to be performed relatively easily. This reduces the load of the determination process.

Additionally, the configuration of one or more embodiments enables at least an image indicating a positional relationship of the foreign substance detected by the foreign substance detection module 339 to the component mounting area Ma to be displayed on the display part 345. This configuration allows for easy visual check of the positional relationship between the detected foreign substance and the component mounting area Ma. Accordingly, this configuration enhances the convenience in confirmation of whether the inspection is performed appropriately (suitably for the purpose) and the convenience in confirmation and adjustment of inspection conditions.

Furthermore, the configuration of one or more embodiments takes advantage of the fact that the hair such as brown hair or blond hair tends to make a clear difference in hue relative to the green resist area 4. One or more embodiments are thus configured to detect a foreign substance in at least the resist area 4 of the hue image by utilizing a hue difference between the foreign substance and the resist area 4. This configuration accordingly enables the brown hair and the blond hair located in the resist area 4 to be detected with high accuracy and enhances the capability of detection of the foreign substance.

The configuration of one or more embodiments also takes advantage of the fact that the hair such as black hair or gray hair out of foreign substances tends to make a clear difference in saturation relative to the green resist area 4. One or more embodiments are thus configured to detect a foreign substance by utilizing a saturation difference between the foreign substance and the resist area 4. This configuration accordingly enables the black hair and the gray hair located in the resist area 4 to be detected with high accuracy and further enhances the capability of detection of the foreign substance.

The present disclosure is not limited to the description of the above embodiments but may be implemented, for example, by configurations described below. The present disclosure may also be naturally implemented by applications and modifications other than those illustrated below.

Figure 16:
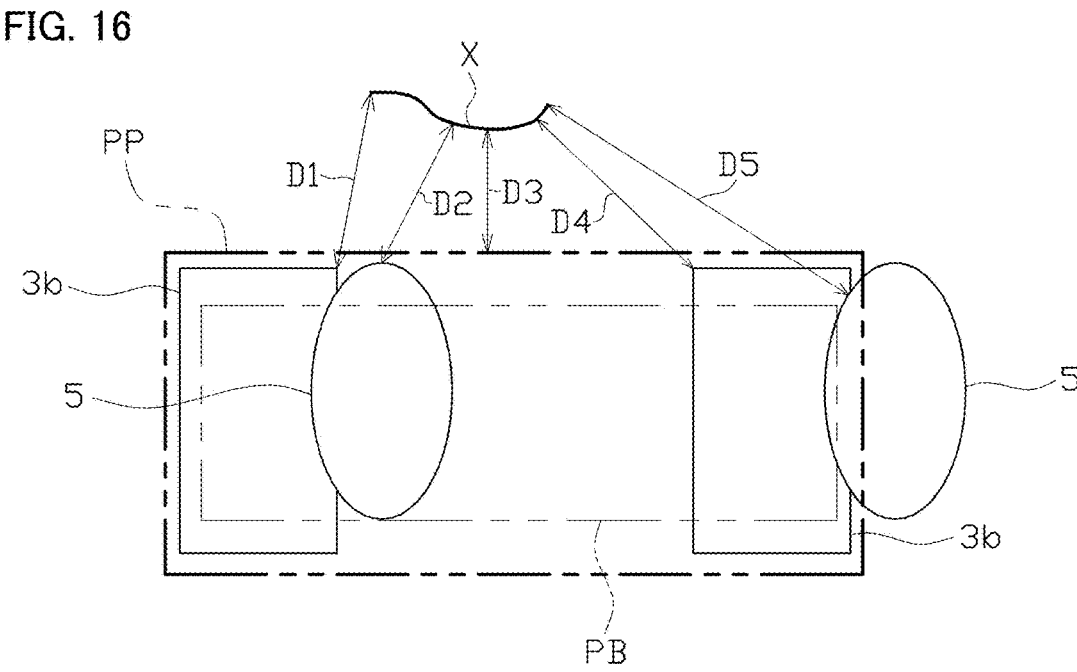
FIG. 16 is a schematic view for providing an explanation for a method of foreign substance defective/non-defective judgment according to one or more embodiments.

(a) According to the embodiments described above, the defective/non-defective judgment module 340 is configured to determine whether a foreign substance is defective or non-defective by determining whether at least one of a plurality of coordinates specified according to the foreign substance location information is included in the range of coordinates specified according to the mounting area information. According to a modification, however, as shown in FIG. 16, the defective/non-defective judgment module 340 may be configured to calculate respective distances from a foreign substance X to an area PP where a component is possibly mounted on (the area shown by the thick two-dot chain line in FIG. 12) and to respective objects such as the lands 3*b* and the solder pastes 5 included in a component mounting area and to determine whether the foreign substance X is defective or non-defective by determining whether a minimum value of these calculated distances is greater than a predetermined reference value Dk set in advance. In the illustrated example of FIG. 16, this modified configuration calculates distances D1, D2, D3, D4 and D5 and compares the distance D3 that is the minimum value among these calculated distances D1 to D5 with the reference value Dk to determine whether the foreign substance is defective or non-defective.

Figure 17:
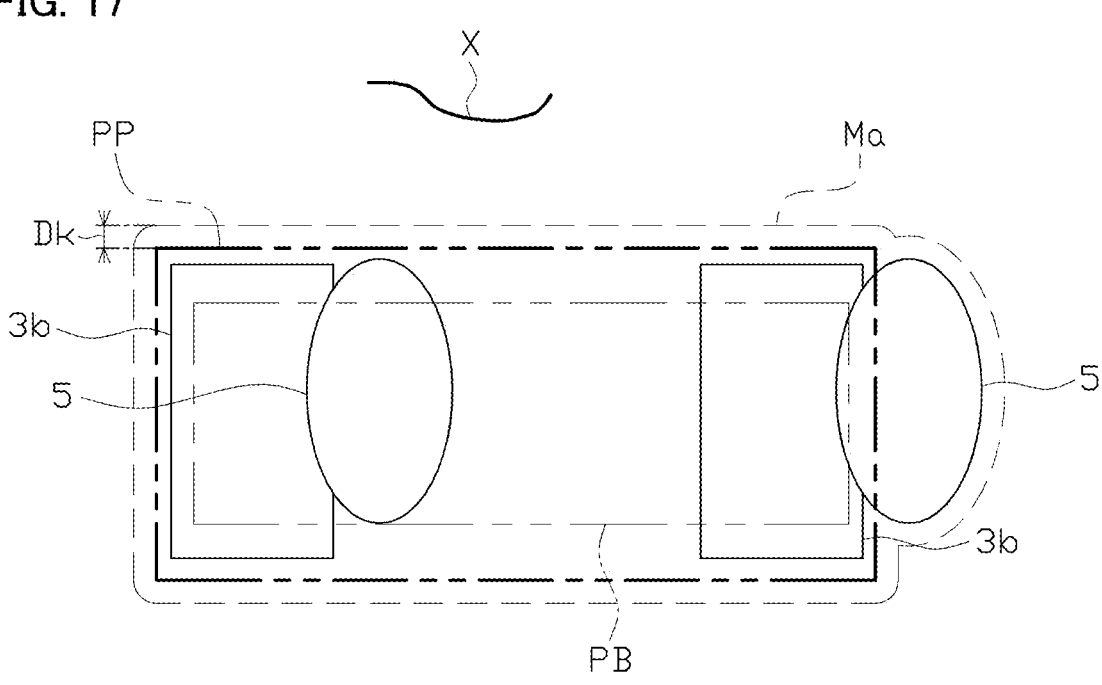
FIG. 17 is a schematic view for providing a supplementary explanation for the method of foreign substance defective/non-defective judgment according to one or more embodiments.
Figure 18:
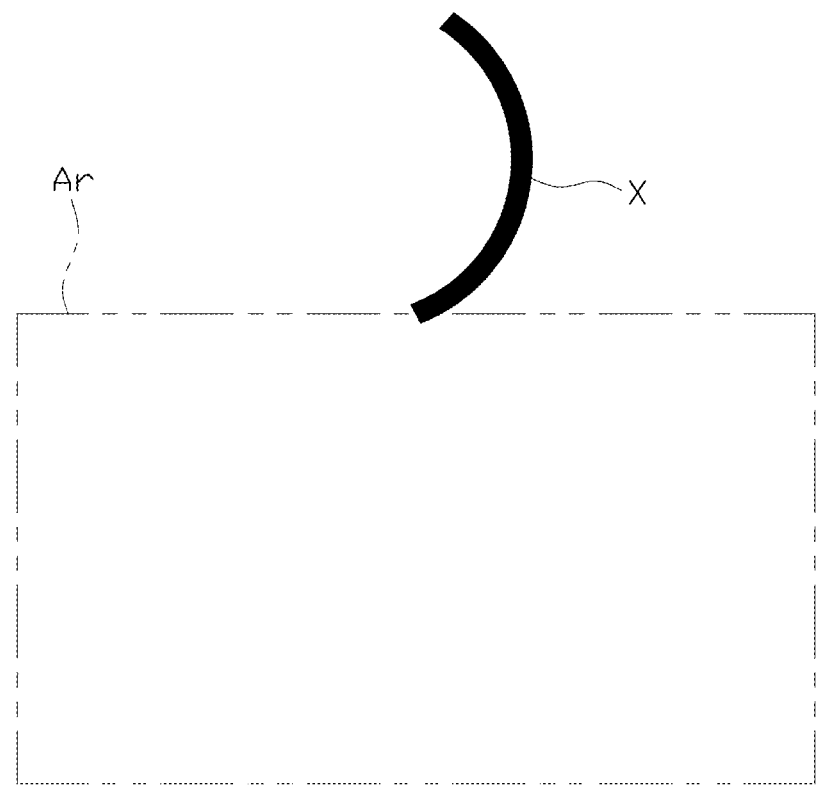
FIG. 18 is a schematic view for providing an explanation for a prior art method of foreign substance detection.

As a result, the defective/non-defective judgment process of the above modification determines whether or not a foreign substance X overlaps the component mounting area Ma or is adjacent to a component mounting area Ma (shown in FIG. 17) that is defined by an outer edge that is away by a distance corresponding to the reference value Dk from the outer edges of the area PP, of the lands 3*b* and of the solder pastes 5.

(b) According to the embodiments described above, the component mounting area Ma is in a rectangular shape. The shape of the component mounting area Ma is, however, not limited to this shape. The shape of the component mounting area Ma may be changed appropriately according to, for example, the shapes of the lands 3*b* or the shape of a component.

(c) The embodiments described above are configured to determine whether a foreign substance is defective or non-defective by determining whether or not the foreign substance overlaps the component mounting area Ma or is adjacent to the component mounting area Ma. The defective/non-defective judgment process of a foreign substance is, however, not limited to this configuration. Any other configuration may be adopted, as long as the determination of whether a foreign substance is defective or non-defective is performed, based on the positional relationship of the foreign substance to the component mounting area Ma. The determination of whether a foreign substance is defective or non-defective may be performed, for example, based on a shortest distance from the component mounting area Ma to a foreign substance or based on an average value of distances from a plurality of positions of a foreign substance to the component mounting area Ma.

(d) According to the embodiments described above, the display controller 341 is configured to display a foreign substance that is detected by the foreign substance detection module 339, on the display part 345. According to a modification, the display controller 341 may be configured to selectively display only a foreign substance that is determined as defective by the defective/non-defective judgment module 340.

In the case where a plurality of foreign substances are present, the display controller 341 may be configured to display information regarding these foreign substances in a sequence of distances of the foreign substances to the component mounting area Ma. For example, enlarged images of the respective foreign substances may be displayed on the display part 345 in the sequence of distances of the foreign substances to the component mounting area Ma.

According to another modification, the display controller 341 may be configured to selectively display only a foreign substance that is away by a distance of not greater than a predetermined distance from the component mounting area Ma, on the display part 345. This configuration may further be modified to allow for expansion or contraction of the component mounting area Ma and to change a foreign substance as a display object according to expansion or contraction of the component mounting area Ma.

(e) According to the embodiments described above, the resist area information obtaining module 337 is configured to obtain the resist area information by extracting a location having a hue in a predetermined range in the hue image of the printed circuit board 1 that is the inspection target, as the resist area. According to a modification, the resist area information obtaining module 337 may be configured to obtain the resist area information by extracting a location having a saturation in a predetermined range in the saturation image, as the resist area. These two configurations of obtaining the resist area information may be used in combination.

(f) According to the embodiments described above, the resist area information obtaining module 337 is configured to obtain the resist area information, based on the image of the printed circuit board 1 that is the inspection target.

According to a modification, the resist area information obtaining module 337 may be configured to obtain the resist area information by at least one of a configuration of using a master color image to obtain a hue image of a master board and extracting an area having a hue substantially equal to the hue of the resist area from the hue image and a configuration of using the master color image to obtain a saturation image of the master board and extracting an area having a saturation substantially equal to the saturation of the resist area from the saturation image. The master color image represents a color image of the master board (not shown) that is an ideal printed circuit board 1. The master color image may be obtained, for example, by using the camera 322 to take an image of a master board that is fed to the post-solder printing inspection device 13 and that is irradiated with the light from the illumination device 321.

The configuration of obtaining the resist area information based on the master color image enables the sufficiently accurate resist area information to be obtained according to the relationship to the printed circuit board 1 that is the inspection target, without using design information or manufacture information described below.

This configuration obtains the resist area information by extracting the area having the hue substantially equal to the hue of the resist area from the hue image and/or by extracting the area having the saturation substantially equal to the saturation of the resist area from the saturation image. Compared with a configuration of using a lightness image, this configuration enables the resist area 4 of the master board to be specified with higher accuracy. As a result, this enables the more accurate resist area information to be obtained.

Furthermore, the resist area information obtaining module 337 may be configured to obtain the resist area information, based on at least one of design information and manufacture information of the printed circuit board 1. One example of the design information is CAD data of the printed circuit board, and one example of the manufacture information is Gerber data of the printed circuit board.

The modified configuration of using the design information or the manufacture information to obtain the resist area information enables the sufficiently accurate resist area information to be readily obtained according to the relationship to the printed circuit board 1 that is the inspection target, even when the printed circuit board 1 or the master board is not at hand.

(g) According to the embodiments described above, the foreign substance detection module 339 is configured to detect a foreign substance by using the hue image and the saturation image, which are based on the color image obtained by the camera 322. According to one modification, the foreign substance detection module 339 may be configured to detect a foreign substance by using only either of the hue image and the saturation image. According to another modification, the foreign substance detection module 339 may be configured to detect a foreign substance by using an image other than the hue image and the saturation image. Accordingly, the foreign substance detection module 339 may be configured to detect a foreign substance by using a color image (RGB image) or a lightness image obtained on the basis of the color image. The lightness image denotes an image indicating lightness values of respective pixels in a color image.

(h) According to the embodiments described above, the respective ring lights 321a, 321b and 321c are configured to radiate the white light. According to one modification, the respective ring lights 321a, 321b and 321c may be configured to radiate red light, blue light and green light (i.e., different color lights). In this modification, the camera 322 may be configured by a monochromatic camera to take images of the printed circuit board 1, every time the irradiation is performed sequentially from the respective ring lights 321a, 321b and 321c, and to thereby obtain a total of three different types of images. The modified configuration may subsequently obtain hue images and saturation images, based on these three different types of images. In the three different types of images, a parameter value with regard to R (red color), a parameter value with regard to G (green color) and a parameter value with regard to B (blue color) are respectively set for each pixel. Accordingly, these three different types of images correspond to the "color image".

(i) The above embodiments are configured to binarize the hue image and the saturation image and obtain the binarized hue image and the binarized saturation image in the process of detecting a foreign substance. It is, however, not necessary to obtain the binarized images. Accordingly, for example, one modification may be configured to detect a foreign substance by directly using the hue image and the saturation image. For example, the modification may be configured to determine the area and the length of a location having a hue in a predetermined range in the hue image or having a saturation in a predetermined range in the saturation image and detect a foreign substance, based on the determined area and length.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . printed circuit board, 4 . . . resist area, 5 . . . solder paste, 13 . . . post-solder printing inspection device (board testing apparatus), 321 . . . illumination device (image obtaining unit), 322 . . . camera (image obtaining unit), 335 . . . hue image obtaining module (hue image obtaining unit), 336 . . . saturation image obtaining module (saturation image obtaining unit), 337 . . . resist area information obtaining module (resist area information obtaining unit), 339 . . . foreign substance detection module (foreign substance detection unit), 340 . . . defective/non-defective judgment module (defective/non-defective judgment unit), 345 . . . display part (display unit), Ma . . . component mounting area

What is claimed is:

1. A board testing apparatus that inspects a printed circuit board on which solder paste is printed, the board testing apparatus comprising:

an image obtaining device that obtains an image of an inspection object area in the printed circuit board, wherein the inspection object area includes a component mounting area where a component of the printed circuit board is mounted; and a control device that:

detects a foreign substance in the inspection object area based on the image, determines that the foreign substance is defective upon detecting that the foreign substance overlaps the component mounting area or is adjacent to the component mounting area when a lump part of the foreign substance has an area greater than an area threshold value or a length greater than a length threshold value, and determines that the foreign substance is non-defective upon detecting that the foreign substance neither overlaps the component mounting area nor is adjacent to the component mounting area even when the lump part of the foreign substance has the area greater than the area threshold value or the length greater than the length threshold value.

2. The board testing apparatus according to claim 1, further comprising:

a display that displays an image indicating the positional relationship.

3. The board testing apparatus according to claim 1, wherein the printed circuit board includes a green resist area, the image obtaining device obtains, with a plurality of color lights, a color image of the inspection object area, and the control device further:

obtains resist area information that specifies a range occupied by the resist area in the printed circuit board, obtains, from the color image, a hue image of the inspection object area, and detects the foreign substance in at least the resist area in the hue image specified based on the resist area information, using a hue difference of the foreign substance relative to the resist area.

4. The board testing apparatus according to claim 2, wherein the printed circuit board includes a green resist area, the image obtaining device obtains, with a plurality of color lights, a color image of the inspection object area, and the control device further:

obtains resist area information that specifies a range occupied by the resist area in the printed circuit board, obtains, from the color image, a hue image of the inspection object area, and detects the foreign substance in at least the resist area in the hue image specified based on the resist area information, using a hue difference of the foreign substance relative to the resist area.

5. The board testing apparatus according to claim 1, wherein the printed circuit board includes a green resist area, the image obtaining device obtains, with a plurality of color lights, a color image of the inspection object area, and the control device further:

obtains resist area information that specifies a range occupied by the resist area in the printed circuit board, obtains, from the color image, a saturation image of the inspection object area, and detects the foreign substance in at least the resist area in the saturation image specified based on the resist area information, using a saturation difference of the foreign substance relative to the resist area.

6. The board testing apparatus according to claim 2, wherein the printed circuit board includes a green resist area, the image obtaining device obtains, with a plurality of color lights, a color image of the inspection object area, the control device further:

obtains resist area information that specifies a range occupied by the resist area in the printed circuit board, obtains, from the color image, a saturation image of the inspection object area, and detects the foreign substance in at least the resist area in the saturation image specified based on the resist area information, using a saturation difference of the foreign substance relative to the resist area.

7. The board testing apparatus according to claim 3, wherein the printed circuit board includes a green resist area, the image obtaining device obtains, with a plurality of color lights, a color image of the inspection object area, the control device further:

obtains resist area information that specifies a range occupied by the resist area in the printed circuit board, obtains, from the color image, a saturation image of the inspection object area, and detects the foreign substance in at least the resist area in the saturation image specified based on the resist area information, using a saturation difference of the foreign substance relative to the resist area.

8. The board testing apparatus according to claim 4, wherein the printed circuit board includes a green resist area, the image obtaining device obtains, with a plurality of color lights, a color image of the inspection object area, the control device further:

obtains resist area information that specifies a range occupied by the resist area in the printed circuit board, obtains, from the color image, a saturation image of the inspection object area, and detects the foreign substance in at least the resist area in the saturation image specified based on the resist area information, using a saturation difference of the foreign substance relative to the resist area.

9. A board testing method for inspecting a printed circuit board on which solder paste is printed, the board testing method comprising:

obtaining an image of an inspection object area in the printed circuit board, wherein the inspection object area includes a component mounting area where a component of the printed circuit board is mounted;

detecting a foreign substance in the inspection object area based on the image;

determining that the foreign substance is defective upon detecting that the foreign substance overlaps the component mounting area or is adjacent to the component mounting area when a lump part of the foreign substance has an area greater than an area threshold value or a length greater than a length threshold value; and determining that the foreign substance is non-defective upon detecting that the foreign substance neither overlaps the component mounting area nor is adjacent to the component mounting area even when the lump part of the foreign substance has the area greater than the area threshold value or the length greater than the length threshold value.

\* \* \* \* \*